US012795384B2

(12) United States Patent
Furuichi

(10) Patent No.: US 12,795,384 B2
(45) Date of Patent: Nov. 10, 2026

(54) COMMUNICATION CONTROL APPARATUS, COMMUNICATION CONTROL METHOD, AND COMPUTER PROGRAM

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 122 days.

(21) Appl. No.: 18/848,117

(22) PCT Filed: Mar. 16, 2023

(86) PCT No.: PCT/JP2023/010389
§ 371 (c)(1),
(2) Date: Sep. 17, 2024

(87) PCT Pub. No.: WO2023/182164
PCT Pub. Date: Sep. 28, 2023

(65) Prior Publication Data

US 2025/0212006 A1 Jun. 26, 2025

(30) Foreign Application Priority Data

Mar. 25, 2022 (JP) ................................ 2022-049411

(51) Int. Cl.
*H04W 16/14* (2009.01)
*H04W 24/02* (2009.01)
(Continued)

(52) U.S. Cl.
CPC ....... *H04W 16/14* (2013.01); *H04W 72/0453* (2013.01)

(58) Field of Classification Search
CPC ... H04W 16/14; H04W 24/02; H04W 72/541; H04W 72/0453; H04W 88/04; H04W 88/12; H04W 92/18
See application file for complete search history.

(56) References Cited

U.S. PATENT DOCUMENTS

2017/0188241 A1* 6/2017 Mueck ................. H04W 16/14

FOREIGN PATENT DOCUMENTS

WO 2019/230156 A1 12/2019
WO 2020/195145 A1 10/2020

OTHER PUBLICATIONS

IP.com search History (Year: 2026).*
(Continued)

*Primary Examiner* — Moustapha Diaby
(74) *Attorney, Agent, or Firm* — CHIP LAW GROUP

(57) ABSTRACT

Provided is a communication control apparatus, a communication control method, and a computer program that effectively improve frequency utilization efficiency. A communication control apparatus according to the present disclosure includes: a communication unit that, based on a right to use radio waves with priority, communicates with at least one of first to N-th communication apparatuses that use first to N-th channels among a plurality of channels as primary channels and to which channels different from the first to N-th channels are assigned as secondary channels; a detection unit that detects that radio waves have been used by a protected system in at least one target channel among the first to N-th channels; and a processing unit that, based on a usage condition of the secondary channel assigned to a target communication apparatus that, among the first to N-th communication apparatuses, is using the target channel as the primary channel, transitions a channel used by the target communication apparatus from the primary channel to the
(Continued)

secondary channel when radio waves are detected to have been used in the target channel.

15 Claims, 27 Drawing Sheets

(51) Int. Cl.

| | |
|---|---|
| ***H04W 72/0453*** | (2023.01) |
| ***H04W 72/20*** | (2023.01) |
| ***H04W 72/40*** | (2023.01) |
| ***H04W 88/04*** | (2009.01) |
| ***H04W 88/12*** | (2009.01) |

(56) References Cited

OTHER PUBLICATIONS

Orbit.com search History (Year: 2026).*

"Operations for Citizens Broadband Radio Service (CBRS): Priority Access License (PAL) Database Technical Specification", Wireless Innovation Forum, WINNF-TS-0245, Version V1.2.0, Mar. 3, 2021, 11 Pages.

"Test and Certification for Citizens Broadband Radio Service (CBRS); Conformance and Performance Test Technical Specification; SAS as Unit Under Test (UUT)", Wireless Innovation Forum, WINNF-TS-0061, Version V1.5.1 , Oct. 7, 2019, 196 Pages.

"Electronic Code of Federal Regulations", Title 47, Chapter I, Subchapter A, Part 1, Subpart X Spectrum Leasing, Aug. 14, 2024, 584 Pages.

International Search Report and Written Opinion of PCT Application No. PCT/JP2023/010389, issued on May 16, 2023, 09 pages of ISRWO.

"Electronic Code of Federal Regulations", Title 47, Chapter I, Subchapter D, Part 96 Citizens Broadband Radio Service, Aug. 14, 2024, 25 Pages.

"CBRS Post Auction PAL Channel Assignment Technical Report", Wireless Innovation Forum, Document WINNF-TR-5005, Version V1.0.0, Jul. 15, 2020, 48 pages.

"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, WINNF-TS-0016, Version V1.2.4 , Jun. 26, 2019, 60 Pages.

"Citizens Broadband Radio Service Devices Handshake Procedures", Federal Communications Commission Office of Engineering and Technology Laboratory Division, 940660 D02, v02, Oct. 22, 2019, 02 Pages.

"Requirements for Commercial Operation in the U.S. 3550-3700 MHz Citizens Broadband Radio Service Band" Wireless Innovation Forum, WINNF-TS-0112, V1.9.1, Mar. 11, 2020, 81 Pages.

* cited by examiner

Fig. 11

| PAL | PAL_A | PAL_B | PAL_C | PAL_D | PAL_E | PAL_F | PAL_G |
|---|---|---|---|---|---|---|---|
| ASSIGNMENT PATTERN FOR SECONDARY CHANNELS | #1 | #2 | #3 | #1 | #2 | #3 | #1 |

Fig. 14

| PAL | PAL_A | PAL_B | PAL_C | PAL_D | PAL_E | PAL_F | PAL_G |
|---|---|---|---|---|---|---|---|
| ASSIGNMENT PATTERN FOR SECONDARY CHANNELS | #6 | #1 | #6 | #4 | #1 | #4 | #1 |

Case 3) #7, #8 and #9 are activated

Fig. 20

| Parameter | R/O/C | Parameter Information |
|---|---|---|
| **NAME**: *frequencyRange*<br>**DATA TYPE**: object: *FrequencyRange* | Required | This parameter is the frequency range of the available channel. |
| **NAME**: *channelType*<br>**DATA TYPE**: string | Required | • "PAL": the frequency range is a PAL channel.<br>• "GAA": the frequency range is for GAA use. |
| **NAME**: *ruleApplied*<br>**DATA TYPE**: string | Required | The regulatory rule used to generate this response, e.g., "FCC_PART_96". |
| **NAME**: *maxEirp*<br>**DATA TYPE**: number | Optional | Maximum EIRP likely to be permitted for a Grant on this *frequencyRange*, given the CBSD registration parameters, including location, antenna orientation and antenna pattern.<br>The maximum EIRP is in the units of dBm/MHz and is an integer or a floating-point value between -137 and +37 (dBm/MHz) inclusive. |

COMMUNICATION CONTROL APPARATUS, COMMUNICATION CONTROL METHOD, AND COMPUTER PROGRAM

CROSS REFERENCE TO RELATED APPLICATIONS

This application is a U.S. National Phase of International Patent Application No. PCT/JP2023/010389 filed on Mar. 16, 2023, which claims priority benefit of Japanese Patent Application No. JP 2022-049411 filed in the Japan Patent Office on Mar. 25, 2022. Each of the above-referenced applications is hereby incorporated herein by reference in its entirety.

TECHNICAL FIELD

The present disclosure relates to a communication control apparatus, a communication control method, and a computer program.

BACKGROUND ART

The issue of radio wave resources (frequencies) that can be allocated to wireless systems being depleted began to surface long ago due to an increase in wireless environments in which diverse wireless systems coexist, as well as the enrichment of content provided wirelessly. Therefore, “Dynamic Spectrum Access” (DSA), which utilizes temporal and spatial white space among frequency bands allocated to specific wireless systems, is rapidly gaining attention as a means of generating necessary radio wave resources.

The Wireless Innovation Forum (WInnForum) Spectrum Sharing Committee (SSC) is known as an organization that standardizes on the Citizens Broadband Radio Service (CBRS) in the United States (NPL 1). The CBRS defines the Priority Access License (PAL) for the right to priority frequency use, and information on channel allocation based on PALs is recorded in the PAL database defined in WINNF-TS-0245 (NPL 2). A primary channel and the secondary channel can be recorded in the PAL database as channels to be allocated based on the PAL. It is expected that the frequency utilization efficiency can be improved by using the secondary channel effectively. However, methods for using the secondary channel effectively have not yet been disclosed.

CITATION LIST

Non Patent Literature

[NPL 1]
Electronic Code of Federal Regulations, Title 47, Chapter I, Subchapter D, Part 96 Citizens Broadband Radio Service [available at https://www.ecfr.gov/cgi-bin/text-idx?node-pt47.5.96]
[NPL 2]
Electronic Code of Federal Regulations, Title 47, Chapter I, Subchapter A, Part 1, Subpart X Spectrum Leasing [available at https://ecfr.federalregister.gov/current/title-47/chapter-I/subchapter-D/part-96]
[NPL 3]
WINNF-TS-0061-V1.5.1 Test and Certification for Citizens Broadband Radio Service (CBRS); Conformance and Performance Test Technical Specification; SAS as Unit Under Test (UUT) [available at https://cbrs.wirelessinnovation.org/release-1-of-the-baseline-standard-specifications]
[NPL 4]
WINNF-TS-0016-V1.2.4 Signaling Protocols and Procedures for Citizens Broadband Radio Service (CBRS): Spectrum Access System (SAS)-Citizens Broadband Radio Service Device (CBSD) Interface Technical Specification [available at https://cbrs.wirelessinnovation.org/release-1-of-the-baseline-standard-specifications]
[NPL 5]
940660 D02 CBSD Handshake Procedures v02 [available at https://apps.fcc.gov/kdb/GetAttachment.html?id=RQe70ZJVSWtOfCcNiBV%2Bfw%3D%3D&desc=940660%20D02%20CPE-CBSD%20Handshake%20Procedures%20v02&tracking_number=229297]
[NPL 6]
WINNF-TS-0245
[NPL 7]
WINNF-TS-0112-V1.9.1 [available at https://cbrs.wirelessinnovation.org/release-1-of-the-baseline-standard-specifications]

SUMMARY

Technical Problem

In view of the issue described above, an object of the present disclosure is to provide a communication control apparatus, a communication control method, and a computer program capable of improving frequency utilization efficiency.

Solution to Problem

A communication control apparatus according to the present disclosure includes: a communication unit that, based on a right to use radio waves with priority, communicates with at least one of first to N-th communication apparatuses that use first to N-th channels among a plurality of channels as primary channels and to which channels different from the first to N-th channels are assigned as secondary channels; a detection unit that detects that radio waves have been used by a protected system in at least one target channel among the first to N-th channels; and a processing unit that, based on a usage condition of the secondary channel assigned to a target communication apparatus that, among the first to N-th communication apparatuses, is using the target channel as the primary channel, transitions a channel used by the target communication apparatus from the primary channel to the secondary channel when radio waves are detected to have been used in the target channel.

BRIEF DESCRIPTION OF DRAWINGS

FIG. 11 is a diagram illustrating an example of an assignment pattern of secondary channels for each of PALs.

FIG. 14 is a diagram illustrating another example of an assignment pattern of secondary channels for each of PALs.

FIG. 20 is a diagram illustrating the configuration of an AvailableChannel object defined in WINNF-TS-0016 (Release 1) and WINNF-TS-3002 (Release 2).

DESCRIPTION OF EMBODIMENTS

Hereinafter, embodiments of the present disclosure will be described with reference to the drawings. In one or more embodiments described in the present disclosure, the elements included in each embodiment can be combined with those of other embodiments, and the results of such combinations are also part of the embodiments described in the present disclosure.

1. Assumed Representative Scenario

<1.1 System Model>

Figure 1:
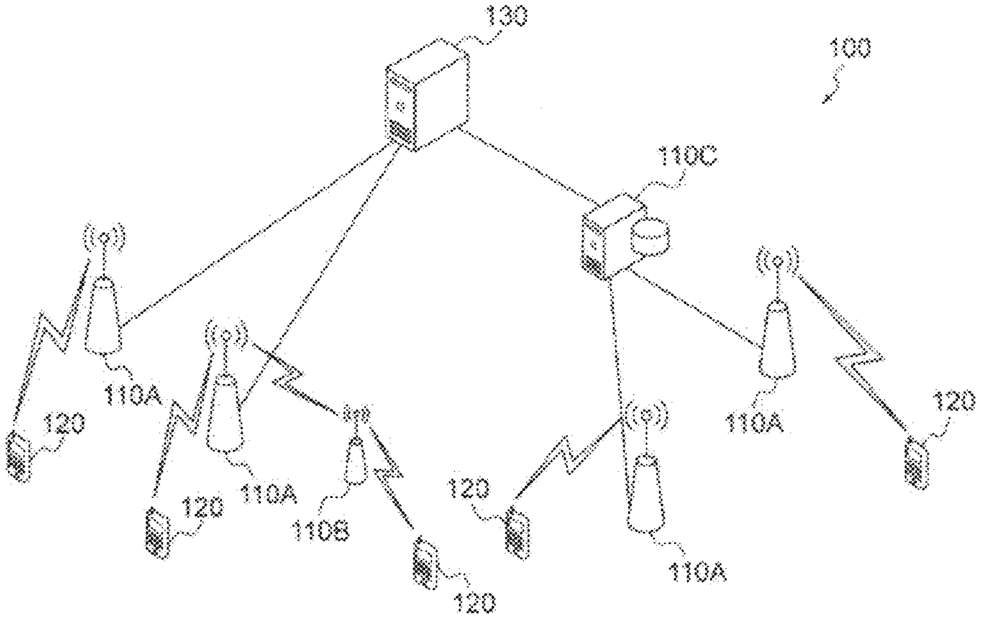
FIG. 1 is a diagram illustrating a system model in an embodiment of the present disclosure.

FIG. 1 illustrates a system model according to one embodiment of the present invention. This system model is represented by a communication network 100 capable of wireless communication, as illustrated in FIG. 1, and is typically constituted by the following entities.

Communication apparatus 110

Terminal 120

Communication control apparatus 130

This system model also includes at least a primary system and a secondary system that use the communication network 100. The primary system and the secondary system are constituted by the communication apparatus 110, or by the communication apparatus 110 and the terminal 120. Various communication systems can be treated as the primary system or the secondary system, but the present embodiment will assume that the primary system and the secondary system use part or all of a frequency band. The frequency bands allocated to the primary system and the secondary system may partially or wholly overlap, or may not overlap at all. That is, this system model will be described as a model of a wireless communication system for Dynamic Spectrum Access (DSA). Note, however, that this system model is not limited to a system for Dynamic Spectrum Access.

The communication apparatus 110 is typically a wireless apparatus that provides a wireless communication service to the terminal 120, such as a wireless base station (base station, Node B, eNB, gNB, or the like) or a wireless access point. That is, the communication apparatus 110 provides a wireless communication service which enables the terminal 120 to communicate wirelessly The communication apparatus 110 may be a radio relay apparatus, or an optical extension apparatus called a remote radio head (RRH). Unless noted otherwise, the following will describe the communication apparatus 110 as being an entity constituting the secondary system.

Coverage (a communication area) provided by the communication apparatus 110 is allowed to have various sizes, from a large size, such as a macro cell, to a small size, such as a pico cell. A plurality of communication apparatuses 110 may form one cell, as in a distributed antenna system (DAS). Further, when the communication apparatus 110 has a beamforming capability, a cell or service area may be formed for each beam.

The present disclosure assumes that there are two different types of communication apparatuses 110.

In the present disclosure, a communication apparatus 110 that can access the communication control apparatus 130 without using a wireless path that requires permission from the communication control apparatus 130 will be called a "communication apparatus 110A". Specifically, for example, a communication apparatus 110 that can connect to the Internet over a wire can be regarded as the "communication apparatus 110A". Additionally, for example, even when a radio relay apparatus does not have a wired Internet connection function, such a radio relay apparatus may also be regarded as the "communication apparatus 110A" if a wireless backhaul link using a frequency that does not require permission from the communication control apparatus 130 is constructed with another communication apparatus 110A.

In the present disclosure, a communication apparatus 110 that cannot access the communication control apparatus 130 without a wireless path that requires permission from the communication control apparatus 130 will be called a "communication apparatus 110B". For example, a radio relay apparatus that needs to construct a backhaul link using a frequency that requires permission from the communication control apparatus 130 can be regarded as the "communication apparatus 110B". Further, for example, an apparatus such as a smartphone including a function of providing a wireless network typified by tethering, which is an apparatus using a frequency that requires permission from the communication control apparatus 130 in both a backhaul link and an access link, nay be treated as "the communication apparatus 110B".

The communication apparatus 110 does not necessarily have to be installed in a fixed manner. For example, the communication apparatus 110 may be installed in a moving object such as an automobile. Further, the communication apparatus 110 does not necessarily have to be present on the ground. For example, the communication apparatus 110 may be included in an object present in the air or space, such as an aircraft, drone, helicopter, high altitude platform station (HAPS), balloon, or satellite. Further, the communication apparatus 110 may be included in an object operating on or under water, such as a ship or a submarine. Typically, such a mobile communication apparatus 110 corresponds to the communication apparatus 110B and secures an access path to the communication control apparatus 130 by performing wireless communication with the communication apparatus 110A. Of course, when a spectrum used for wireless communication with the communication apparatus 110A is not managed by the communication control apparatus 130, the mobile communication apparatus 110 can be handled as the communication apparatus 110A.

In the present disclosure, unless otherwise specified, the term "communication apparatus 110" encompasses the meaning of both the communication apparatus 110A and the communication apparatus 110B, and may be read as either.

The communication apparatus 110 may be used, operated, or managed by various types of operators. For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (school corporation, municipal board of education, or the like), a real estate (building, apartment building, or the like) manager, an individual, or the like are conceivable as operators involved with the communication apparatus 110. The operator involved in the communication apparatus 110 is not particularly limited. Further, the communication apparatus 110A may be a shared facility that is used by a plurality of operators. Further, operators who install, use, operate, and manage a facility may be different from each other.

The communication apparatus 110 operated by an operator is typically connected to the Internet via a core network. Further, operation, administration, and maintenance are performed by a function called operation, administration, and maintenance (OA&M). Further, for example, as illustrated in FIG. 1, there may be an intermediate apparatus (network manager) 110C that integrally controls the communication apparatuses 110 in the network. The intermediate apparatus may be the communication apparatus 110 or may be the communication control apparatus 130.

The terminal 120 (User Equipment, User Terminal, User Station, Mobile Terminal, Mobile Station, or the like) is an apparatus that communicates wirelessly using a wireless communication service provided by the communication apparatus 110. Typically, a communication device such as a smartphone corresponds to the terminal 120. Any apparatus having a wireless communication function can correspond to the terminal 120. For example, a device such as a camera for business use having a wireless communication function may correspond to the terminal 120 even when wireless communication is not the main use thereof. Further, a communication device that transmits data to the terminal 120, such as a radio station for broadcasting business (FPU: Field Pickup Unit) that transmits an image for television broadcasting or the like from the outside of a broadcasting station (on-site) to the broadcasting station in order to perform sports relay or the like also corresponds to the terminal 120. Further, the terminal 120 does not necessarily have to be used by a person. For example, a device such as a machine in a factory or a sensor installed in a building may be connected to a network and operate as the terminal 120, in what is known as machine type communication (MTC). A device called customer premises equipment (CPE) provided to ensure Internet connection may act as the terminal 120.

Further, the terminal 120 may have a relay communication function, as typified by device-to-device (D2D) or vehicle-to-everything (V2X).

Further, the terminal 120 does not need to be fixedly installed or be present on the ground, like the communication apparatus 110. For example, an object present in the air or a space, such as an aircraft, drone, helicopter, or a satellite, may operate as the terminal 120. Further, for example, an object present on or under water, such as a ship or a submarine, may operate as the terminal 120.

In the present disclosure, unless otherwise prescribed, the terminal 120 corresponds to an entity in which a radio link using a frequency that requires permission from the communication control apparatus 130 is terminated. However, the terminal 120 may perform the same operation as the communication apparatus 110 depending on the functions of the terminal 120 or the network topology to be applied. In other words, depending on the network topology, an apparatus that can correspond to the communication apparatus 110, such as a wireless access point, can correspond to the terminal 120, or an apparatus that can correspond to the terminal 120, such as a smartphone, can correspond to the communication apparatus 110.

The communication control apparatus 130 is typically an apparatus that performs a determination, use permission, instruction, and/or management of communication parameters for the communication apparatus 110. For example, database servers called TV White Space Database (TVWSDB), Geolocation Database (GLDB), Spectrum Access System (SAS), and Automated Frequency Coordination (AFC) correspond to the communication control apparatus 130. In other words, a database server having authorities and roles such as authentication and supervision of radio wave use related to secondary use of frequencies can be regarded as the communication control apparatus 130.

The communication control apparatus 130 also corresponds to a database server having a role different from the roles described above. For example, a control apparatus that performs radio wave interference control between communication apparatuses, which is typified by a Spectrum Manager (SM) in EN 303 387 of European Telecommunications Standards Institute (ETSI), Coexistence Manager (CM) in Electrical and Institute of Electronics Engineers (IEEE) 802.19.1-2018, Coexistence Manager (CxM) in CBRSA- TS-2001, or the like, also corresponds to the communication control apparatus 130. Further, for example, Registered Location Secure Server (RLSS) prescribed by IEEE 802.11-2016 also corresponds to the communication control apparatus 130. That is, the present disclosure is not limited to these examples, and an entity responsible for a determination, use permission, instruction, management, or the like of the communication parameters of the communication apparatus 110 may be called the communication control apparatus 130. Basically, a control target of the communication control apparatus 130 is the communication apparatus 110, but the communication control apparatus 130 may control the terminal 120 under the control of the communication apparatus 110.

The communication control apparatus 130 also corresponds to a combination of a plurality of database servers having different roles. For example, CBRS Alliance SAS (CSAS) that is a combination of SAS and CxM, as described in CBRSA-TS-2001, can also be regarded as communication control apparatus 130.

The communication control apparatus 130 can also be realized by implementing software having the same functions as those of one database server in the database server. For example, a SAS with a CxM-equivalent function or software can also be regarded as the communication control apparatus 130.

There may be a plurality of communication control apparatuses 130 having the same role. When there are a plurality of communication control apparatuses 130 having the same role, at least one of the following three types of decision-making topologies can be applied to the communication control apparatuses 130.

Autonomous Decision-Making

Centralized Decision-Making

Distributed Decision-Making

Figure 2:
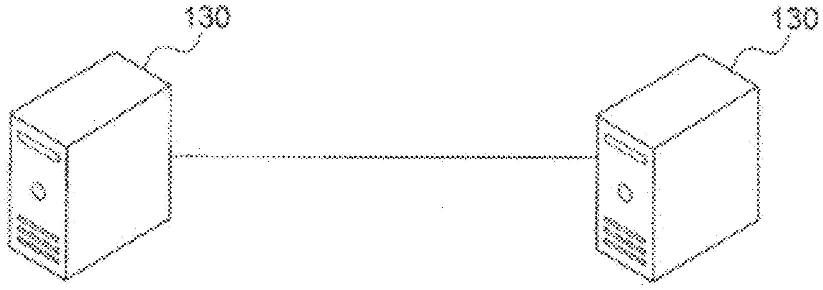
FIG. 2 illustrates a network configuration to which autonomous decision-making can be applied.

Autonomous decision-making is a decision-making topology in which an entity making a decision (a decision-making entity; here, the communication control apparatus 130) makes a decision independently of other decision-making entities. The communication control apparatus 130 independently performs calculations for necessary frequency allocation or interference control. For example, when the plurality of communication control apparatuses 130 are distributed as illustrated in FIG. 2, autonomous decision-making can be applied.

Figure 3:
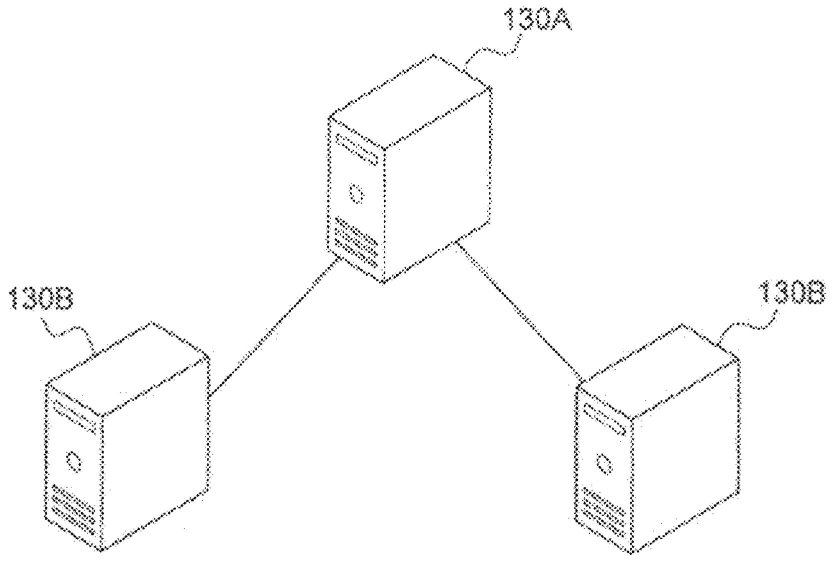
FIG. 3 illustrates a network configuration to which centralized decision-making can be applied.

Centralized decision-making is a decision-making topology in which a decision-making entity delegates decision-making to another decision-making entity. When centralized decision-making is performed, for example, a model such as that illustrated in FIG. 3 is assumed. FIG. 3 illustrates a model (what is known as a "master-slave type") in which one communication control apparatus 130 centrally controls the plurality of communication control apparatuses 130. In the model in FIG. 3, a communication control apparatus 130A serving as a master can centrally control a plurality of communication control apparatuses 130B serving as slaves, and make decisions in an intensive manner.

Distributed decision-making is a decision-making topology in which a decision-making entity cooperates with another decision-making entity to make decisions. For example, the plurality of communication control apparatuses 130 making decisions independently, as in the autonomous decision-making in FIG. 2, with each communication control apparatus 130 making a decision and then performing mutual adjustment of decision-making results, negotiation, and the like, may correspond to "distributed decision-making". Further, for example, the master communication control apparatus 130A dynamically delegating decision-making authority to each slave communication control apparatus 130B, or discarding the decision-making authority, for the purpose of load distribution (load balancing) in the centralized decision-making illustrated in FIG. 3 can also be regarded as "distributed decision-making".

Figure 4:
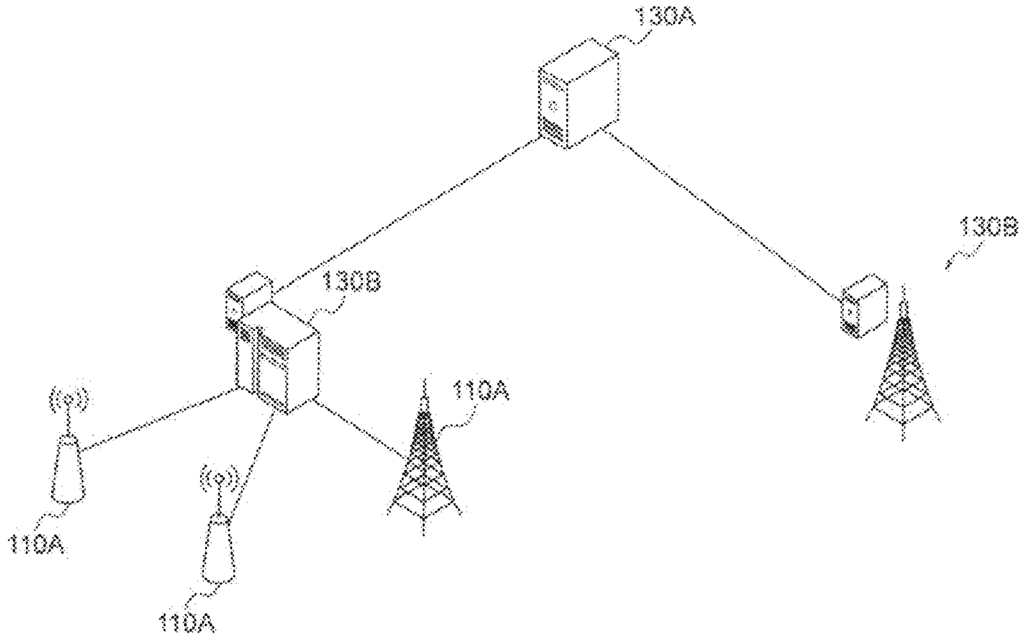
FIG. 4 illustrates a network configuration in a case in which both centralized decision-making and distributed decision-making are applied.

There can be situations where both centralized decision-making and distributed decision-making are applied. In FIG. 4, the slave communication control apparatus 130B operates as an intermediate apparatus that binds a plurality of communication apparatuses 110. The master communication control apparatus 130A need not control the communication apparatuses 110 bound by the slave communication control apparatus 130B, that is, a secondary system constituted by the slave communication control apparatuses 130B. In this manner, an implementation such as that illustrated in FIG. 4 is also possible as a variation.

The communication control apparatus 130 can also obtain necessary information from entities other than the communication apparatus 110 and the terminal 120 of the communication network 100 for its role. Specifically, for example, information necessary to protect the primary system can be obtained from a database (a regulatory database) managed or operated by a national regulatory authority (NRA) in a country or region. The Universal Licensing System (ULS) operated by the Federal Communications Commissions (FCC) of United States can be given as an example of a regulatory database. Position information of the primary system, communication parameters of the primary system, the out-of-band emission (OOBE) limit, adjacent channel leakage ratio (ACLR), adjacent channel selectivity, fading margin, and protection ratio (PR) can be given as examples of the information necessary for protecting the primary system. In order to protect the primary system, it is preferable to use information set by law as the information necessary for protecting the primary system in regions where fixed numerical values, obtainment methods, derivation methods, and the like are set by law.

A database that holds records regarding the communication apparatus 110 and the terminal 120 that have received conformity authorization, such as the Equipment Authorization System (EAS) managed by the Office of Engineering and Technology (OET) of the FCC, also corresponds to the regulatory database. Information on operation frequencies of the communication apparatus 110 or the terminal 120, information on the maximum equivalent isotropic radiated power (EIRP), and the like can be obtained from such a regulatory database. Of course, the communication control apparatus 130 may use this information to protect the primary system.

Further, it can also be assumed that the communication control apparatus 130 obtains radio wave sensing information from a radio wave sensing system installed and operated for the purpose of radio wave detection of the primary system. As a specific example, in the Citizens Broadband Radio Service (CBRS) in United States, the communication control apparatus 130 obtains radio wave detection information of a shipboard radar, which is a primary system, from a radio wave sensing system called an Environmental Sensing Capability (ESC). Further, when the communication apparatus 110 or the terminal 120 has a sensing function, the communication control apparatus 130 may obtain radio wave detection information of the primary system from the communication apparatus 110 or the terminal 120.

It is also assumed that the communication control apparatus 130 obtains activity information of the primary system from a portal system that manages the activity information of the primary system. As a specific example, in the Citizens Broadband Radio Service (CBRS) of United States, the communication control apparatus 130 obtains the activity information of the primary system from a calendar type system called Informing Incumbent Portal. A protection area called a dynamic protection area (DPA) is activated on the basis of the obtained activity information to protect the primary system. Protection of the primary system is realized in a similar scheme by an equivalent system, called informing incumbent capability (IIC).

An interface between the entities constituting this system model may be wired or may be wireless. For example, as an interface between the communication control apparatus 130 and the communication apparatus 110, not only a wired line but also a wireless interface that does not depend on spectrum access may be used. As wireless interfaces that do not depend on spectrum access, there are, for example, a wireless communication line provided through a licensed band by a mobile network operator, and Wi-Fi communication using an existing license-exempt band.

<1.2 Terminology Regarding Frequency and Sharing>

As described above, description will be given assuming a Dynamic Spectrum Access environment in the present embodiment. As a representative example of Dynamic Spectrum Access, a mechanism defined by CBRS in United States (that is, a mechanism defined by Part 96 Citizens Broadband Radio Service of FCC rules in United States) will be described.

Figure 5:
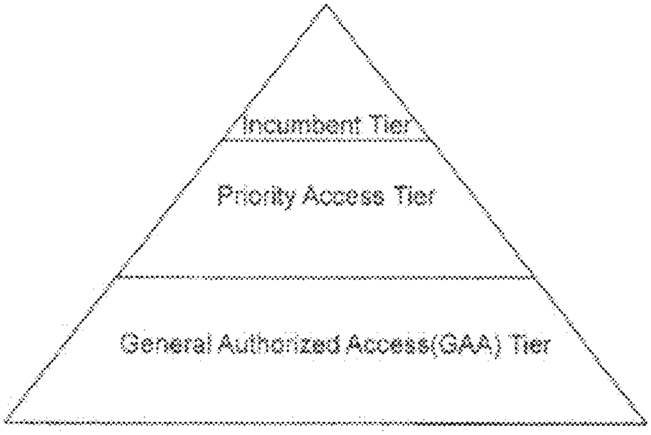
FIG. 5 is a diagram illustrating a three-tier structure in CBRS.

In CBRS, each user of a frequency band is classified into one of three groups, as illustrated in FIG. 5. This group is called a tier. The three groups are called an incumbent tier, a priority access tier, and a general authorized access (GAA) tier, respectively.

The incumbent tier is a group of existing users who have traditionally used the frequency band. The existing users are also generally referred to as primary users. In CBRS, the Department of Defense (DOD) of United States, a fixed satellite operator, and a Grandfathered Wireless Broadband Licensee (GWBL) are defined as existing users. The incumbent tier is not required to avoid interference with the priority access tier and the GAA tier having a lower priority, nor to suppress the use of the frequency band. Further, the incumbent tier is also protected from interference with the priority access tier and GAA tier. That is, the users of the incumbent tier can use the frequency band without considering the presence of other groups.

The priority access tier is a group of users who use the frequency band on the basis of the above-described priority access license (PAL). The users of the priority access tier are also generally referred to as secondary users. When the frequency band is used, the priority access tier is required to avoid interference and suppress the use of the frequency band with respect to the incumbent tier having a higher priority than the priority access tier. Meanwhile, the priority access tier is required to avoid interference and suppress the use of the frequency band with respect to the GAA tier having a lower priority than the priority access tier. Further, the priority access tier is not protected from interference with the incumbent tier having a higher priority, but is protected from interference with the GAA tier having a lower priority.

The GAA tier is a group of frequency band users that do not belong to the incumbent tier and priority access tier. The users of the GAA tier are also generally referred to as secondary users, similar to the priority access tier. However, the user is also called a low-priority secondary user because a shared use priority is lower than that if the priority access tier. When the frequency band is used, the GAA Tier is required to both avoid interference and suppress frequency band use for the Incumbent Tier and the Priority Access Tier, which have higher priority. Further, the GAA tier is not protected from interference due to the incumbent tier and the priority access tier having a higher priority.

Although the mechanism of CBRS has been described above as a representative example of Dynamic Spectrum Access, the present embodiment is not limited to the definition of CBRS. For example, as illustrated in FIG. 5, CBRS generally adopts a three-tier structure, but a two-tier structure may be adopted in the present embodiment. Representative examples of the two-tier structure may include Authorized Shared Access (ASA), Licensed Shared Access (LSA), evolved LSA (eLSA), TV band White Space (TVWS), and US 6 GHz band access. ASA, LSA and eLSA do not have a GAA tier, and a structure equivalent to a combination of the incumbent tier and the priority access tier is adopted. Further, there is no priority access tier in the TVWS and the US 6 GHz band access, and the same structure as a combination of the incumbent tier and the GAA tier is adopted. Further, there may be four or more tiers. Specifically, four or more tiers may be generated by, for example, providing a plurality of intermediate tiers corresponding to the priority access tiers and assigning different priorities to the respective intermediate tiers. Further, for example, the GAA tier may be similarly divided, a priority may be assigned, and the number of tiers may be increased. That is, each group may be divided.

Further, the primary system of the present embodiment is not limited to the definition of the CBRS. For example, as examples of the primary system, TV broadcasting, fixed microwave links (FS: Fixed System), meteorological radar, radio altimeter, wireless train control system (communications-based train control), and a wireless system such as radio astronomy are assumed. Further, the present disclosure is not limited thereto, any wireless system can be the primary system of the present embodiment.

Further, as described above, the present embodiment is not limited to a spectrum access environment. Generally, in the spectrum access or frequency secondary use, an existing system using a target frequency band is called a primary system, and a secondary user is called a secondary system, but these should be replaced with other terms and read when the present embodiment is applied to an environment other than the spectrum access environment. For example, a macro cell base station in a heterogeneous network (HetNet) may be a primary system, and a small cell base station or a relay station may be a secondary system. Further, the base station may be a primary system, and a relay user equipment (UE) or vehicle UE realizing D2D and V2X present within a coverage thereof may be a secondary system. The base station is not limited to a fixed type, and may be portable or mobile. In such a case, for example, the communication control apparatus 130 of the present embodiment may be included in a core network, base station, relay station, relay UE, or the like.

Further, when the present embodiment is applied to environments other than the spectrum access environment, the term "frequency" in the present disclosure is replaced with another term shared by an application destination. For example, it is assumed that the terms are replaced with terms such as "resource", "resource block", "resource element", "resource pool", "channel", "component carrier", "carrier", "subcarrier", "bandwidth part (BWP)", and "frequency range", or other terms having equivalent or similar meanings.

1. Description of Various Procedures Assumed in Present Embodiment

Basic procedures that can be used in implementing the present embodiment will be described herein. Description will be made assuming that the present embodiment is mainly implemented in the communication apparatus 110A up to <2.5> that will be described below.

<2.1 Registration Procedure>

A registration procedure is a procedure for registering information on a wireless system desiring to use the frequency band. More specifically, the registration procedure is a procedure for registering device parameters regarding the communication apparatus 110 of the wireless system in the communication control apparatus 130. Typically, the registration procedure is initiated by the communication apparatus 110 representing the wireless system intending to use the frequency band notifying the communication control apparatus 130 of a registration request including the device parameters. When the plurality of communication apparatuses 110 belong to the wireless system intending to use the frequency band, device parameters of each of the plurality of communication apparatuses are included in the registration request. Further, an apparatus that transmits the registration request on behalf of the wireless system may be determined appropriately.

<2.1.1 Details of Required Parameters>

The device parameters refer to, for example, the following information.

- Information on a user of the communication apparatus 110 (hereinafter referred to as user information)
- Unique information of the communication apparatus 110 (hereinafter referred to as unique information)
- Information on the position of the communication apparatus 110 (hereinafter referred to as position information)
- Information on an antenna of the communication apparatus 110 (hereinafter referred to as antenna information)
- Information on the wireless interface of the communication apparatus 110 (hereinafter referred to as wireless interface information).
- Legal information on the communication apparatus 110 (hereinafter referred to as legal information)
- Information on an installer of the communication apparatus 110 (hereinafter referred to as installer information)
- Information on a group to which the communication apparatus 110 belongs (hereinafter, group information)

The device parameters are not limited to the above. Information other than these may be treated as the device parameter. The device parameters do not have to be transmitted once, and may be transmitted in a divided manner at multiple times. That is, a plurality of registration requests may be transmitted for one registration procedure. Thus, one procedure or one processing within the procedure may be divided into a plurality of times and performed. The same applies to procedures to be described below.

The user information is information related to the user of the communication apparatus 110. For example, user ID, account name, user name, user contact, call sign, or the like can be assumed. The user ID and the account name may be uniquely generated by the user of the communication apparatus 110 or may be issued in advance by the communication control apparatus 130. It is preferable to use the call sign that is issued by the NRA.

The user information can be used, for example, for interference resolution. As a specific example, even when the communication control apparatus 130 performs a use stop decision for a spectrum that is being used by the communication apparatus 110, in the spectrum use notification procedure described in <2.5> to be described below, and issues an instruction based on the use stop decision, a spectrum use notification request for the spectrum may continue to be notified. In this case, the communication control apparatus 130 may suspect a problem with the communication apparatus 110 and may perform contact for a behavior confirmation request of the communication apparatus 110 with respect to the user contact included in the user information. The present disclosure is not limited to this example and, when a decision is made that the communication apparatus 110 is performing an operation contrary to the communication control performed by the communication control apparatus 130, the communication control apparatus 130 can contact using the user information.

The unique information is information with which the communication apparatus 110 can be specified, product information of the communication apparatus 110, information on hardware or software of the communication apparatus 110, and the like.

The information with which the communication apparatus 110 can be specified can include, for example, a manufacturing number (serial number) of the communication apparatus 110 or an ID of the communication apparatus 110. The ID of the communication apparatus 110 may be uniquely assigned by the user of the communication apparatus 110, for example.

The product information of the communication apparatus 110 can include, for example, an authentication ID, product model number, and information on a manufacturer. The approval ID is an ID assigned from an approval authority in each country or region, such as an FCC ID in United States, CE number in Europe, and the certification of conformance to technical standards (technical conformance) in Japan. An ID issued on the basis of an independent authentication program by an industry association or the like may also be regarded as the authentication ID.

Unique information typified by these can be used for, for example, the use of an allow list or a deny list. For example, when any information related to the communication apparatus 110 in operation is included in the deny list, the communication control apparatus 130 can instruct the communication apparatus 110 to stop the spectrum use in the spectrum use notification procedure described in <2.5> to be described below Further, the communication control apparatus 130 can behave, for example, not to release use suspension measures until the communication apparatus 110 is released from the deny list. Further, for example, the communication control apparatus 130 can reject registration of the communication apparatus 110 included in the deny list. Further, for example, the communication control apparatus 130 can also perform an operation that the communication apparatus 110 corresponding to information included in the deny list is not considered in interference calculation of the present disclosure, or only the communication apparatus 110 corresponding to information included in the allow list is considered in the interference calculation.

In the present disclosure, the FCC ID may be treated as information on transmission power. For example, in an equipment authorization system (EAS) database that is a type of regulatory database, information on a certified apparatus can be obtained, and its API (Application Programming Interface) is also open to the public. For example, certified maximum EIRP information or the like which has been authorized can be included in the information together with the FCC ID. Since such power information is associated with the FCC ID, the FCC ID can be treated as transmission power information. Similarly, the FCC ID may be treated as the same information as other information included in the EAS. Further, the present disclosure is not limited to the FCC ID and, when there is information associated with the authentication ID, the authentication ID may be treated as being equivalent to that information.

Examples of information on the hardware of the communication apparatus 110 can include transmission power class information. As the transmission power class information, for example, US Title 47 C.F.R (Code of Federal Regulations) Part 96 defines two types of classes, namely Category A and Category B, and information on hardware of the communication apparatus 110 conforming to those definitions can include information on which of the two classes the hardware belongs to. Further, in 3rd Generation Partnership Project (3GPP) TS36.104 and TS38.104, several classes of eNodeB and gNodeB are defined, and the definitions thereof can also be used.

The transmission power class information can be used, for example, for the interference calculation. It is possible to perform the interference calculation using maximum transmission power prescribed for each class as the transmission power of the communication apparatus 110.

The information on the software of the communication apparatus 110 can include, for example, version information or a build number regarding an execution program describing processing required for interaction with the communication control apparatus 130. Further, version information or build number of software for operating as the communication apparatus 110 may also be included.

The position information is typically information that can identify the position of the communication apparatus 110. For example, the position information is coordinate information obtained by a positioning function typified by a Global Positioning System (GPS), Beidou, Quasi-Zenith Satellite System (QZSS), Galileo, or Assisted Global Positioning System (A-GPS). Typically, information related to latitude, longitude, ground height/elevation, altitude, and positioning error may be included. Alternatively, for example, the position information may be position information registered in an information management apparatus managed by a National Regulatory Authority (NRA) or its entrusted agency. Alternatively, for example, the position information may be coordinates of X-, Y-, and Z-axes with a specific geographical position as an origin. Further, in addition to such coordinate information, an identifier indicating whether the communication apparatus 110 is present outdoors or indoors can be assigned.

Further, location uncertainty may also be included in the position information. For example, both or either of a horizontal plane and a vertical plane may be provided as the location uncertainty. The location uncertainty can be used, for example, as a correction value when a distance to any point is calculated. Further, for example, the location uncertainty can be used as area information at which the communication apparatus 110 is likely to be located. In this case, the location uncertainty is used for processing such as specifying usable frequency information within an area indicated by the position uncertainty.

Further, the position information may be information indicating an area in which the communication apparatus 110 is located. For example, information indicating an area determined by the government, such as a postal code and an address, may be used. Further, for example, the area may be indicated by a set of three or more geographic coordinates. The information indicating the area may be provided together with coordinate information.

Further, when the communication apparatus 110 is located indoors, information indicating a floor of a building in which the communication apparatus 110 is located may also be included in the position information. For example, an identifier indicating the number of floors, ground, or underground may be included in the position information. Further, information indicating an additional indoor closed space, such as a room number or a room name in a building may be included in the position information.

It is preferable for the positioning function to be typically included in the communication apparatus 110. However, the performance of the positioning function may not satisfy required precision. Further, even when the performance of the positioning function satisfies required accuracy, position information that satisfies the required accuracy may not always be able to be obtained depending on an installation position of the communication apparatus 110. Therefore, the positioning function may be included in an apparatus other than the communication apparatus 110, and the communication apparatus 110 may obtain information on a position from such an apparatus. The apparatus with the positioning function may be an existing available apparatus, or may be provided by the installer of the communication apparatus 110. In such a case, it is preferable for position information measured by the installer of the communication apparatus 110 to be written to the communication apparatus 110.

The antenna information is typically information indicating the performance, configuration, and the like of the antenna included in the communication apparatus 110. Typically, information such as antenna installation height, tilt angle (downtilt), horizontal orientation (azimuth), boresight, antenna peak gain, and antenna model may be included.

Further, the antenna information may also include information on beams that can be formed. For example, information such as a beam width, a beam pattern, and analog or digital beamforming capabilities may be included.

The antenna information can also include information on the performance or configuration of Multiple Input Multiple Output (MIMO) communication. For example, information such as the number of antenna elements, the maximum number of spatial streams (or the number of MIMO layers) may be included. Further, codebook information to be used, weight matrix information, or the like may also be included. The weight matrix information includes unitary matrix, Zero-Forcing (ZF) matrix, Minimum Mean Square Error (MMSE) matrix, or the like, and these are obtained by Singular Value Decomposition (SVD), Eigen Value Decomposition (EVD), Block Diagonalization (BD), or the like. Further, when the communication apparatus 110 has a function such as Maximum Likelihood Detection (MLD) requiring nonlinear operations, information indicating the included function may be included in the antenna information.

Further, the antenna information may include ZoD (Zenith of Direction, Departure). ZoD is a type of radio wave arrival angle. The ZOD may not be notified of from the communication apparatus 110, but may be estimated from radio waves radiated from the antenna of the communication apparatus 110 by the other communication apparatus 110 and notified of. In this case, the communication apparatus 110 may be an apparatus operating as a base station or an access point, an apparatus performing D2D communication, a moving relay base station, or the like. The ZoD can be estimated by radio wave arrival direction estimation technology such as multiple signal classification (MUSIC) or estimation of signal propagation via rotation invariance techniques (ESPRIT). Further, ZoD can be used by the communication control apparatus 130 as measurement information.

The wireless interface information is typically information indicating a wireless interface technology included in the communication apparatus 110. For example, identifier information indicating a technology used in GSM, CDMA2000, UMTS, E-UTRA, E-UTRA NB-IoT, 5G NR, 5G NR NB-IoT or a further next-generation cellular system may be included as the wireless interface information. Further, identifier information indicating long term evolution (LTE)/5G-compliant derivative technology such as MulteFire, long term evolution-unlicensed (LTE-U), and NR-Unlicensed (NR-U) may also be included. Further, identifier information indicating a standard technology such as a metropolitan area network (MAN) such as WiMAX and WiMAX2+, and an IEEE 802.11 wireless LAN may also be included. Identifier information indicating extended global platform (XGP) or Shared XGP (sXGP) may also be included. Identifier information of a communication technology for LPWA (Local Power, Wide Area) may also be included. Further, identifier information indicating a proprietary wireless technology may be included. Further, a version number or release number of a technical specification defining these technologies may be included as the wireless interface information.

Frequency band information supported by the communication apparatus 110 may also be included in the wireless interface information. For example, the frequency band information can be represented by an upper limit frequency, a lower limit frequency, a center frequency, a bandwidth, a 3GPP operating band number, or a combination of at least two of these. Further, one or more pieces of frequency band information may be included in the wireless interface information.

As the frequency band information supported by the communication apparatus 110, information indicating capability of a band extension technology such as carrier aggregation (CA) or channel bonding may be further included. For example, combinable band information may be included. Further, regarding the carrier aggregation, information on a band desired to be used as a primary component carrier (PCC) or a secondary component carrier (SCC) may also be included. The number of component carriers (CC number) that can be aggregated at the same time can be also included.

As the frequency band information supported by the communication apparatus 110, information indicating a combination of frequency bands supported by dual connectivity and multi connectivity may be further included. Further, information on other communication apparatuses 110 that cooperatively provide dual connectivity and multi connectivity may also be provided. In subsequent procedures, the communication control apparatus 130 may take into consideration other communication apparatuses 110 that are in a cooperative relationship or the like to perform a decision of communication control disclosed in the present embodiment.

Information indicating a radio wave use priority such as PAL and GAA may also be included as the frequency band information supported by the communication apparatus 110.

The wireless interface information may also include modulation scheme information supported by the communication apparatus 110. For example, as a representative example, information indicating a primary modulation scheme such as frequency shift keying (FSK), n-value phase shift keying (PSK; where n is a multiplier of 2 such as 2, 4, or 8), or n-value quadrature amplitude modulation (QAM; where n is a multiplier of 4, such as 4, 16, 64, 256, and 1024) may be included. Further, information indicating a secondary modulation scheme such as orthogonal frequency division multiplexing (OFDM), scalable OFDM, DFT spread OFDM (DFT-s-OFDM), generalized frequency division multiplexing (GFDM), or filter bank multi carrier (FBMC) is included.

Further, the wireless interface information may also include information on error correction code. For example, the wireless interface information may include capability such as turbo code, low density parity check (LDPC) code, polar code, or erasure correction code, or coding rate information to be applied.

The modulation scheme information or the information on the error correction code can also be represented by modulation and coding scheme (MCS) indexes as another aspect.

Further, the wireless interface information may also include information indicating functions specific to each radio technology specification supported by the communication apparatus 110. For example, a representative example may include transmission mode (TM) information defined in LTE. In addition, those having two or more modes for a specific function can be included in the wireless interface information like TM information. Further, in the technical specification, in a case in which the communication apparatus 110 supports a function that is not essential to the specification even when two or more modes do not exist, information indicating the supported function can also be included.

Further, the wireless interface information may also include Radio Access Technology (RAT) information supported by the communication apparatus 110. For example, information indicating time division multiple access (TDMA), frequency division multiple access (FDMA), orthogonal frequency division multiple access (OFDMA), power division multiple access (PDMA), code division multiple access (CDMA), sparse code multiple access (SCMA), interleave division multiple access (IDMA), spatial division multiple access (SDMA), carrier sense multiple access/collision avoidance (CSMA/CA), carrier sense multiple access/collision detection (CSMA/CD), or the like may be included. TDMA, FDMA, and OFDMA are classified as orthogonal multiple access (OMA). PDMA, CDMA, SCMA, IDMA, and SDMA are classified as non-orthogonal multiple access (NOMA). A representative example of PDMA is a scheme realized by combining superposition coding (SPC) and successive interference canceller (SIC). CSMA/CA and CSMA/CD are classified as opportunistic access methods (opportunistic access).

When the wireless interface information includes information indicating the opportunistic access, information indicating details of the access scheme may also be included. As a specific example, information indicating whether the scheme is a frame based equipment (FBE) or load based equipment (LBE) defined in EN 301 598 of ETSI may be included.

When the wireless interface information indicates LBE, LBE-specific information such as priority class may be further included.

The wireless interface information may also include information related to a duplex mode supported by the communication apparatus 110. As a representative example, information on a scheme such as frequency division duplex (FDD), time division duplex (TDD), and full duplex (FD) may be included.

When TDD is included as the wireless interface information, TDD frame structure information used or supported by the communication apparatus 110 can be assigned. Further, the information related to the duplex mode may be included for each frequency band indicated by the frequency band information.

When the FD is included as the wireless interface information, information on an interference power detection level may be included.

Further, the wireless interface information can also include information on a transmission diversity scheme supported by the communication apparatus 110. For example, space time coding (STC) may be included.

The wireless interface information may also include guard band information. For example, information on a guard band size determined for the wireless interface in advance may be included. Alternatively, for example, information on the guard band size desired by the communication apparatus 110 may be included.

The wireless interface information may be provided for each frequency band regardless of the above aspect.

The legal information typically is information on regulations with which the communication apparatus 110 should comply, which is defined by a radio regulatory authority in each country or region, or an equivalent organization, or authentication information obtained by the communication apparatus 110. Examples of the information on regulations typically includes upper limit information of out-of-band emission, and information on blocking characteristics of a receiver. Examples of the authentication information can typically include type approval information and regulatory information serving as a reference for obtaining approval. The type approval information includes, for example, the FCC ID in US, and the certification of conformance to technical standards in Japan. The regulatory information corresponds to, for example, FCC regulation number in US or ETSI Harmonized Standard number in Europe.

Information defined in a specification of a wireless interface technology may be substituted for Information on numerical values in the legal information. The specification of the wireless interface technology corresponds to, for example, 3GPP TS 36.104 or TS 38.104. The adjacent channel leakage ratio (ACLR) is prescribed in these. The upper limit information on out-of-band emission may be derived and used using ACLR prescribed in the specification instead of the upper limit information on out-of-band emission. Further, ACLR itself may be used as necessary. Further, adjacent channel selectivity (ACS) may also be used instead of blocking characteristics. Further, these may be used together, or an adjacent channel interference ratio (ACIR) may be used. In general, ACIR has the following relationship with ACLR and ACS.

[Math. 1]

$$ACIR = \left(\frac{1}{ACS} + \frac{1}{ACLR}\right)^{-1} \quad (1)$$

Although a true value expression is used in Equation (1), Equation (1) may be represented by a logarithmic expression.

The installer information can include information that can identify the person (installer) who installed the communication apparatus 110, unique information associated with the installer, and the like. Typically, installer information can include information on an individual who is responsible for the location information of the communication apparatus 110, which is called a certified professional installer (CPI) defined in NPL 2. CPI discloses a certified professional installer registration ID (CPIR-ID) and a CPI name. In addition, as unique information associated with to CPI, for example, contact address (a mailing address or contact address), an email address, a telephone number, a public key identifier (PKI), and the like are disclosed. The installer information is not limited thereto and other information on the installer may be included in the installer information as needed.

The group information may include information on a communication apparatus group to which the communication apparatus 110 belongs. Specifically, for example, information related to the same or equivalent type of group as that disclosed in WINNF-SSC-0010 may be included. Further, for example, when the mobile network operator manages the communication apparatuses 110 in units of groups according to its own operation policy, information on the group can be included in the group information.

The information listed so far may be inferred from other information provided from the communication apparatus 110 by the communication control apparatus 130 without being provided to the communication control apparatus 130 by the communication apparatus 110. Specifically, for example, the guard band information can be inferred from the wireless interface information. When the wireless interface used by the communication apparatus 110 is E-UTRA or 5G NR, the guard band information can be inferred on the basis of a transmission bandwidth specification of E-UTRA described in 3GPP TS36.104, a transmission bandwidth specification of 5G NR described in 3GPP TS38.104, and a table given in TS38.104 shown below.

TABLE 1

Table 5.6-1 Transmission bandwidth configuration NRB in E-UTRA channel bandwidths (Quoted from Table 5.6-1 of TS36.104 of 3GPP)

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

TABLE 2

Table 5.3.3-1: Minimum guardband (kHz) (FR1) (Quoted from Table 5.3.3-1 of TS38.104 of 3GPP)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 3

Table: 5.3.3-2: Minimum guardband (kHz) (FR2) (Quoted from Table: 5.3.3-2 of TS38.104 of 3GPP)

| | SCS (kHz) | | | |
|---|---|---|---|---|
| | 50 MHz | 100 MHz | 200 MHz | 400 MHz |
| 60 | 1210 | 2450 | 4930 | N.A |
| 120 | 1900 | 2420 | 4900 | 9860 |

TABLE 4

Table: 5.3.3-3: Minimum guardband (kHz) of SCS 240 kHz SS/PBCH block (FR2) (Quoted from TS38.104 Table: 5.3.3-3 of 3GPP)

| | SCS (kHz) | | |
|---|---|---|---|
| | 100 MHz | 200 MHz | 400 MHz |
| 240 | 3800 | 7720 | 15560 |

In other words, it is sufficient for the communication control apparatus 130 to be able to obtain the information listed so far, and the communication apparatus 110 does not necessarily need to provide the information to the communication control apparatus 130. Further, an intermediate apparatus 130B (for example, network manager) that binds the plurality of communication apparatuses 110 does not need to provide the information to the communication control apparatus 130A. The communication apparatus 110 or the intermediate apparatus 130B providing information to the communication control apparatus 130 or 130A is merely one means of providing the information in the present embodiment. The information listed so far means that the information is information necessary for the communication control apparatus 130 to normally complete the present procedure, and means for providing the information does not matter. For example, in WINNF-TS-0061, such a method is called Multi-Step Registration and allowed.

Further, naturally, the information listed so far is selectively applicable depending on local legal systems and technical specifications.

<2.1.1.1 Supplement to Required Parameters>

In the registration procedure, it is assumed that device parameters regarding not only the communication apparatus 110 but also the terminal 120 are required to be registered in the communication control apparatus 130 in some cases. In such a case, the term "communication apparatus" in the description described in <2.1.1> may be replaced with the "terminal" or a similar term, and the term may be applied. Further, "terminal"-specific parameters not described in <2.1.1> may be treated as required parameters in the registration procedure. Examples thereof may include a user equipment (UE) category defined by 3GPP.

<2.1.2 Details of Registration Processing>

As described above, the communication apparatus 110 representing the wireless system attempting to use the frequency band generates a registration request including the device parameters and notifies the communication control apparatus 130 of the registration request.

Here, when the installer information is included in the device parameter, the communication apparatus 110 may use the installer information to perform, for example, processing of falsification prevention on the registration request. Further, encryption processing may be performed on part or all of information included in the registration request. Specifically, for example, a unique public key may be shared in advance between the communication apparatus 110 and the communication control apparatus 130, and the communication apparatus 110 may use a private key corresponding to the public key to encrypt information. An example of an encryption target may include information sensitive to crime prevention, such as the position information.

The ID and the position information of the communication apparatus 110 are open to the public, and the communication control apparatus 130 may hold an ID and position information of a main communication apparatus 110 present within its own coverage in advance. In such a case, since the communication control apparatus 130 can obtain the position information from the ID of the communication apparatus 110 that has transmitted the registration request, the position information need not be included in the registration request. Further, it is also conceivable that the communication control apparatus 130 returns necessary device parameters to the communication apparatus 110 that has transmitted the registration request, and the communication apparatus 110 receives this and transmits a registration request including the device parameters necessary for registration. Thus, the information included in the registration request may vary from case to case.

After registration request reception, the communication control apparatus 130 performs registration processing for the communication apparatus 110 and returns a registration response according to a processing result. When there are no shortage and no abnormality of information necessary for registration, the communication control apparatus 130 records the information in an internal or external storage apparatus and notifies of normal completion. Otherwise, the communication control apparatus 130 notifies of registration failure. When the registration is normally completed, the communication control apparatus 130 may individually assign an ID to each communication apparatus 110 and notify the communication apparatus 110 of the ID information at the time of a response. When the registration fails, the communication apparatus 110 may notify of the modified registration request again. Further, the communication apparatus 110 may change the registration request and attempt the registration procedure until normal completion.

The registration procedure may be executed even after the registration has normally been completed. Specifically, the registration procedure may be re-executed when the position information changes beyond a predetermined reference, for example, due to movement, accuracy improvement, or the like. The predetermined reference is typically set by a legal system of each country or region. For example, in 47 C.F.R Part 15 of United States, Mode II personal/portable white space devices, that is, devices that use vacant frequencies should be re-registered when positions thereof change by 100 meters or more.

<2.2 Available Spectrum Query Procedure>

The available spectrum query procedure is a procedure in which the wireless system attempting to use the frequency band inquires of the communication control apparatus 130 about information on the available spectrum. It is not always necessary to perform the available spectrum query procedure. Further, the communication apparatus 110 that makes the query on behalf of the wireless system attempting to use the frequency band may be the same as or different from the communication apparatus 110 that has generated the registration request. Typically, the procedure is started by the communication apparatus 110 making a query notifying the communication control apparatus 130 of a query request including the information with which the communication apparatus 110 can be specified.

Here, the available spectrum information is typically information indicating a frequency that the communication apparatus 110 can safety use for secondary use without fatal interference with the primary system.

The available spectrum information is determined, for example, on the basis of a secondary use prohibition area called an exclusion zone. Specifically, for example, when the communication apparatus 110 is installed in the secondary use prohibition area provided for the purpose of protecting the primary system that uses a frequency channel F1, the communication apparatus 110 is not notified of the frequency channel F1 as an available channel.

The available spectrum information can also be determined, for example, by a degree of interference with the primary system. Specifically, for example, even in an area other than the secondary use prohibition area, when a decision is made that the communication apparatus gives the fatal interference with the primary system, the frequency channel may not be notified as an available channel. An example of a specific calculation method is described in <2.2.2> to be described below.

Further, as described above, there may be frequency channels that are not notified as being available according to conditions other than primary system protection requirements. Specifically, for example, in order to avoid interference that may occur between the communication apparatuses 110 in advance, a frequency channel being used by the other communication apparatus 110 present near the communication apparatus 110 may not be notified as an available channel. Thus, the available spectrum information set in consideration of interference with the other communication apparatuses 110 may be set as, for example, "recommended frequency information" and provided together with the available spectrum information. That is, it is preferable for the "recommended frequency information" to be a subset of the available spectrum information.

When an influence can be avoided by decreasing the transmission power even in a case in which the primary system is influenced, the same frequency as the primary system or nearby communication apparatus 110 may be notified as an available channel. In such a case, maximum allowable transmission power is typically included in the available spectrum information. The maximum allowable transmission power is typically expressed in EIRP. The present disclosure does not have to be always limited thereto, and may be provided, for example, in a combination of antenna power (conducted power) and an antenna gain. Further, for the antenna gain, an allowable peak gain may be set for each spatial direction.

<2.2.1 Details of Required Parameters>

Information with which the wireless system attempting to use the frequency band can be specified can be assumed to be, for example, unique information registered in the registration procedure, and the ID information described above.

Further, query requirement information may also be included in the query request. The query requirement information may include, for example, information indicating a frequency band of which the availability is desired to be known. Further, for example, the transmission power information may be included. The communication apparatus 110 performing the query may include the transmission power information, for example, when the communication apparatus 110 desires to know only frequency information in which the desired transmission power is likely to be used. The query requirement information does not necessarily have to be included in the query request.

Information indicating a format of the available spectrum information may also be included in the information indicating the frequency band. The IEEE 802.11 standard defines a channel number for each band. For example, a flag requesting whether a channel defined by such a wireless interface technical specification is used may be included. As another format, a flag requesting whether a unit frequency range rather than the defined channel is used may be included. When the unit frequency is 1 MHz, available spectrum information is requested for each frequency range of 1 MHz. When this flag is used, desired unit frequency information may be enclosed in the flag.

Further, the query request may also include a measurement report. The measurement report includes results of measurements performed by the communication apparatus 110 and/or the terminal 120. Some or all of the measurement results may be represented by raw data or may be represented by processed data. For example, standardized metrics typified by reference signal received power (RSRP), reference signal strength indicator (RSSI), and reference signal received quality (RSRQ) can be used for measurement.

<2.2.2 Details of Available Spectrum Evaluation Processing>

After the query request is received, evaluation of the available spectrum is performed on the basis of the query requirement information. For example, error! Reference not found. As described above, it is possible to perform the evaluation of the available spectrum in consideration of the primary system, the secondary use prohibition area thereof, and the presence of nearby communication apparatuses 110.

The communication control apparatus may derive the secondary use prohibition area. For example, when maximum transmission power $P_{MaxTx(dBm)}$ and minimum transmission power $P_{MinTx(dBm)}$ are defined, it is possible to calculate a range of a separation distance between the primary system and the secondary system from the following equation, and determine the secondary use prohibition area.

[Math. 2]

$$PL^{-1}(P_{MaxTx(dBm)} - I_{Th(dBm)})_{(dB)} \leq d < PL^{-1}(P_{MinTx(dBm)} - I_{Th(dBm)})_{(dB)}$$

$I_{Th(dBm)}$ denotes allowable interference power (a limit value of allowable interference power), d denotes a distance between a predetermined reference point and the communication apparatus 110, and $PL(\ )_{(dB)}$ is a propagation loss function. Thereby, it is possible to determine frequency availability depending on a positional relationship between the primary system and the communication apparatus 110. Further, when transmission power information or power range information desired to be used by the communication apparatus 110 is supplied as a request, $PL^{-1}(P_{Tx(dBm)}-I_{Th(dBm)})$ can be calculated and compared with the range equation to determine the frequency availability.

Maximum allowable transmission power information may be derived. Typically, the maximum allowable transmission power information is calculated using allowable interference power information in the primary system or a protection zone thereof, position information of a reference point for calculating an interference power level suffered by the primary system, registration information of the communication apparatus 110, and a propagation loss estimation model. Specifically, as an example, the maximum allowable transmission power information is calculated by the following equation.

[Math. 3]

$$P_{MaxTx(dBm)} = I_{Th(dBm)} + PL(d)_{(dB)} \quad (2)$$

In Equation (2), an antenna gain in a transceiver is not included, but the antenna gain in the transceiver may be included according to a method of expressing the maximum allowable transmission power (EIRP, conducted power, or the like) or a reference point of reception power (antenna input point, antenna output point, or the like). A safety margin for compensating for a variation due to fading, or the like may be also included. Further, a feeder loss may also be considered as necessary. Further, it is possible to perform the same calculation for neighboring channels by taking into account an adjacent channel leakage ratio (ACRL) or a maximum value of out-of-band emission.

Further, Equation (2) is written on the basis of the assumption that a single communication apparatus 110 is an interference source (single-station interference). For example, if aggregated interference from a plurality of communication apparatuses 110 must be considered at the same time, a correction value may be added. Specifically, for example, a correction value can be determined on the basis of three types (Fixed/Predetermined, Flexible, and Flexible Minimized) of interference margin allocation schemes disclosed in NPL 3 (ECC Report 186).

It is not always possible to directly use the allowable interference power information itself, as in Equation (2). For example, when a required signal to interference ratio (SIR), signal to interference plus noise ratio (SINR), or the like of the primary system are available, these may be converted into allowable interference power and used. Such conversion processing is not limited to this processing, and may be applied to processing of other procedures.

Although Equation (2) is expressed using a logarithm, this may be naturally converted to antilogarithm and used at the time of implementation. Further, all parameters of a logarithmic notation described in the present disclosure may be appropriately converted to an antilogarithm and used.

Further, when the above-described transmission power information is included in the query requirement information, it is possible to perform the evaluation of the available spectrum using a method other than the above-described method. Specifically, for example, in a case in which it is assumed that the desired transmission power indicated by the transmission power information has been used, when an amount of interference to be estimated is smaller than the allowable interference power in the primary system or a protection zone thereof, a decision is made that the frequency channel is available and the communication apparatus 110 is notified of this.

Further, for example, when an area or space in which the communication apparatus 110 can use the frequency band is determined in advance, the available spectrum information may be simply derived on the basis only on coordinates (X-axis, Y-axis, Z-axis coordinates or latitude, longitude, and ground height of the communication apparatus 110) included in the position information of the communication apparatus 110, as in an area of a radio environment map (REM). Further, for example, even when a lookup table in which coordinates of the position of the communication apparatus 110 are associated with the available spectrum information is prepared, the available spectrum information may be derived on the basis only on the position information of the communication apparatus 110. Thus, there are various methods for determining the available spectrum, and the methods are not limited to the examples of the present disclosure.

Further, when the communication control apparatus 130 obtains the information on the capability of the band extension technology such as carrier aggregation (CA) or channel bonding as the frequency band information supported by the communication apparatus 110, the communication control apparatus 130 may include an available combination of these, a recommended combinations, or the like in the available spectrum information.

Further, when the communication control apparatus 130 obtains information on a combination of frequency bands supported by dual connectivity and multi connectivity as the frequency band information supported by the communication apparatus 110, the communication control apparatus 130 may include, in the available spectrum information, information such as an available spectrum and a recommended spectrum for the dual connectivity and multi connectivity.

Further, in a case in which available spectrum information for the band extension technology as described above is provided, when an imbalance in the maximum allowable transmission power is generated among a plurality of frequency channels, the maximum allowable transmission power of each frequency channel may be adjusted and then the available spectrum information may be provided. For example, from the viewpoint of primary system protection, the maximum allowable transmission power of each frequency channel may be aligned with the maximum allowable transmission power of a frequency channel with a low maximum allowable power spectral density (PSD).

The evaluation of the available spectrum does not necessarily have to be performed after the query request is received. For example, the communication control apparatus 130 may independently perform the evaluation without the query request after the normal completion of the registration procedure described above. In such a case, the REM or lookup table shown as an example above, or an information table similar thereto may be created.

In addition, radio wave use priority such as PAL and GAA may also be evaluated. For example, if registered device parameters or query requirements include information on the priority of radio wave use, it may be possible to determine whether frequency use is possible on the basis of the priority and signal it. Further, as disclosed in NPL 2, for example, if information (referred to as a cluster list in NPL 2) on the communication apparatus 110 that performs high-priority use (for example, PAL) has been registered by a user in advance in the communication control apparatus 130, evaluation may be performed on the basis of this information.

After the evaluation of the available spectrum is completed, the communication control apparatus 130 notifies the communication apparatus 110 of an evaluation result.

The communication apparatus 110 may use the evaluation result received from the communication control apparatus 130 to select a desired communication parameter. When a spectrum grant procedure, which will be described below, is not adopted, the communication apparatus 110 may start radio wave transmission using the selected desired communication parameter as the communication parameter.

<2.3 Spectrum Grant Procedure>

The spectrum grant procedure is a procedure in which the wireless system attempting to use the frequency band receives secondary spectrum grant from the communication control apparatus 130. The communication apparatus 110 that performs the spectrum grant procedure on behalf of the wireless system may be the same as or different from the communication apparatus 110 that has performed the procedures so far. Typically, the procedure is started by the communication apparatus 110 notifying the communication control apparatus 130 of a spectrum grant request including the information with which the communication apparatus 110 can be specified. As described above, the available spectrum query procedure is not essential. Therefore, the spectrum grant procedure may be performed after the available spectrum query procedure, or may be performed after the registration procedure.

In the present embodiment, it is assumed that at least two types of spectrum grant request schemes below can be used.

Designation scheme

Flexible scheme

The designation scheme is a request scheme in which the communication apparatus 110 designates the desired communication parameter and asks the communication control apparatus 130 to permit an operation based on the desired communication parameter. The desired communication parameters include, but are not limited to, a frequency channel to be used, maximum transmission power, and the like. For example, wireless interface technology-specific parameters (modulation scheme, duplex mode, or the like) may be designated. Further, information indicating the radio wave use priority such as PAL and GAA may be included.

The flexible scheme is a request scheme in which the communication apparatus 110 designates only requirements regarding the communication parameters and requests the communication control apparatus 130 to designate communication parameters of which secondary use can be permitted, while satisfying the requirements. The requirements regarding the communication parameters include, but are not limited to, for example, bandwidth, desired maximum transmission power, or desired minimum transmission power. For example, wireless interface technology-specific parameters (modulation scheme, duplex mode, or the like) may be designated. Specifically, for example, one or more of TDD frame structures may be selected in advance and notified of.

The spectrum grant request may also include a measurement report regardless of whether the scheme is any one of the designation scheme and the flexible scheme, like the query request. The measurement report includes results of measurements performed by the communication apparatus 110 and/or the terminal 120. The measurement may be represented by raw data or may be represented by processed data. For example, standardized metrics typified by reference signal received power (RSRP), reference signal strength indicator (RSSI), and reference signal received quality (RSRQ) can be used for measurement.

The scheme information used by the communication apparatus 110 may be registered in the communication control apparatus 130 in the registration procedure described in <2.1>.

<2.3.1 Details of Spectrum Grant Processing>

After the communication control apparatus 130 receives the spectrum grant request, the communication control apparatus 130 performs spectrum grant processing on the basis of a spectrum grant request scheme. For example, with the scheme described in <2.2>, it is possible to perform spectrum grant processing in consideration of the primary system, the secondary use prohibition area, the presence of nearby communication apparatuses 110, and the like.

When the flexible scheme is used, the maximum allowable transmission power information may be derived using the scheme described in <2.2.2>. Typically, the maximum allowable transmission power information is calculated using the allowable interference power information in the primary system or its protection zone, the position information of the reference point for calculating the interference power level suffered by the primary system, the registration information of the communication apparatus 110, and the propagation loss estimation model. Specifically, as an example, the maximum allowable transmission power information is calculated by Equation (2) above.

Further, as described above, Equation (2) is written on the basis of the assumption that a single communication apparatus 110 is an interference source. For example, if aggregated interference from a plurality of communication apparatuses 110 must be considered at the same time, a correction value may be added. Specifically, for example, the correction value can be determined on the basis of three types (Fixed/Predetermined, Flexible, and Flexible Minimized) of methods disclosed in NPL 3 (ECC Report 186).

The communication control apparatus 130 can use various propagation loss estimation models in the spectrum grant procedure, available spectrum evaluation processing for an available spectrum information query request, and the like. If a model is designated for each application, it is desirable to use the designated model. For example, in NPL 2 (WINNF-TS-0112), a propagation loss model such as extended Hata (eHATA) or an irregular terrain model (ITM) is adopted for each application. Of course, propagation loss models are not limited thereto.

There is also the propagation loss estimation model that requires information on a radio wave propagation path. Information indicating inside and outside a line of sight (LOS: Line of Sight and/or NLOS: Non Line of Sight), topographical information (undulation, sea level, or the like), or environmental information (urban, suburban, rural, open sky, or the like), for example, can be included in the information on the radio wave propagation path. In using the propagation loss estimation model, the communication control apparatus 130 may infer information thereof from the registration information of the communication apparatus 110 or information of the primary system that has already been obtained. Alternatively, when there is a parameter designated in advance, it is preferable to use the parameter.

When the propagation loss estimation model is not designated for a predetermined use, the propagation loss estimation model may be used as necessary. For example, when interference power to the other communication apparatus 110 is estimated, a model in which a loss is calculated to be small, such as a free space loss model, is used, but when coverage of the communication apparatus 110 is estimated, a model in which a loss is calculated to be large is used.

Further, when the designated propagation loss estimation model is used, it is possible to perform spectrum grant processing on the basis of evaluation of the interference risk, as an example. Specifically, for example, in a case in which it is assumed that the desired transmission power indicated by the transmission power information has been used, when an amount of interference to be estimated is smaller than the allowable interference power in the primary system or a protection zone thereof, a decision is made that use of the frequency channel is permissible and the communication apparatus 110 is notified of this.

In both the designated scheme and the flexible scheme, radio wave use priority such as PAL and GAA may be evaluated in the same manner as the query request. For example, if registered device parameters or query requirements include information on radio wave use priority, it may be determined whether frequency use is possible on the basis of the priority and signaled. Further, for example, if information on a communication apparatus 110 that performs high-priority use (for example, PAL) has been registered by a user in advance in the communication control apparatus 130, evaluation may be performed on the basis of this information. For example, in NPL 2 (WINNF-TS-0112), information on the communication apparatus 110 is called a cluster list.

Further, when the position information of the communication apparatus is used in any of the calculations, the frequency availability may be determined by correcting the position information or coverage using the location uncertainty.

The spectrum grant processing does not necessarily have to be executed due to reception of the spectrum grant request. For example, the communication control apparatus 130 may independently perform the processing without the spectrum grant request after normal completion of the registration procedure described above. Further, for example, the spectrum grant processing may be performed at regular intervals. In such cases, the above-described REMs, lookup table, or similar information table may be created. Accordingly, since permissible frequency can be determined only with the position information, the communication control apparatus 130 can quickly return a response after receiving the spectrum grant request.

<2.4 Spectrum Use Notification/Heartbeat>

The spectrum use notification is a procedure in which a wireless system using the frequency band notifies the communication control apparatus 130 of spectrum use based on communication parameters permitted for use in the spectrum grant procedure. The communication apparatus 110 that performs the spectrum use notification on behalf of the wireless system may be the same as or different from the communication apparatus 110 that has performed the procedures so far. Typically, the communication apparatus 110 notifies the communication control apparatus 130 of a notification message including the information with which the communication apparatus 110 can be specified.

It is preferable for the spectrum use notification to be periodically performed until the communication control apparatus 130 refuses spectrum use. In this case, the spectrum use notification is also called a heartbeat.

After reception of the spectrum use notification, the communication control apparatus 130 may determine whether spectrum use (in other words, radio wave transmission at a permitted frequency) is started or continued. Examples of a determination method may include confirmation of the spectrum use information of the primary system. Specifically, it is possible to determine whether to permit or deny the start or continuation of the spectrum use (radio transmission at the permitted frequency) on the basis of change in the use spectrum of the primary system, change in a spectrum use situation of a primary system in which radio wave use is not regular (for example, a shipboard radar of CBRS in US), or the like. When the start or continuation is permitted, the communication apparatus 110 may start or continue the spectrum use (radio transmission at the permitted frequency).

After the spectrum use notification is received, the communication control apparatus 130 may instruct the communication apparatus 110 to reconfigure the communication parameters. Typically, the reconfiguration of the communication parameters can be instructed in the response of the communication control apparatus 130 to the spectrum use notification. For example, information on recommended communication parameters (hereinafter referred to as recommended communication parameter information) can be provided. It is preferable for the communication apparatus 110 that has received the recommended communication parameter information to perform the spectrum grant procedure described in <2.4> again using the recommended communication parameter information.

<2.5 Supplement to Various Procedures>

The various procedures do not necessarily need to be implemented separately, as will be described below. For example, two different procedures may be realized by substituting a third procedure having roles of the two different procedures. Specifically, for example, the registration request and the available spectrum information query request may be integrally notified. Further, for example, the spectrum grant procedure and the spectrum use notification may be performed integrally. Of course, the present disclosure is not limited to the combinations thereof, and three or more procedures may be integrally performed. Further, as described above, one procedure may be divided and performed a plurality of times.

Further, the term "obtain" or similar expressions in the present disclosure does not necessarily mean obtaining according to the procedures described in the present disclosure. For example, although it is described that the position information of the communication apparatus 110 is used for the available spectrum evaluation processing, this means that it is not always necessary to use information obtained in the registration procedure, and when position information is included in the available spectrum query procedure request, the position information may be used. In other words, the procedure for obtainment described in the present disclosure is an example, and obtainment by another procedure is also permitted within the scope of the present disclosure and within the scope of technical feasibility.

Further, the information described as being included in the response from the communication control apparatus 130 to the communication apparatus 110 may be actively notified from the communication control apparatus 130 using a push scheme, if possible. As a specific example, the available spectrum information, the recommended communication parameter information, radio wave transmission continuation deny notification, and the like may be notified using a push scheme.

<2.6 Various Procedures Regarding Terminal>

Up to this point, the processing in the communication apparatus 110A is mainly assumed and the description has been made. However, according to the present embodiment, not only the communication apparatus 110A, but also the terminal 120 or the communication apparatus 110B may operate under the control of the communication control apparatus 130. That is, a scenario in which the communication parameters are determined by the communication control apparatus 130 is assumed. In such a case, it is basically possible to use each procedure described in <2.1> to <2.4>. However, the terminal 120 or the communication apparatus 110B needs to use a frequency managed by the communication control apparatus 130 for the backhaul link, and cannot arbitrarily transmit radio waves, unlike the communication apparatus 110A. Therefore, it is preferable to detect radio waves or an authorization signal transmitted by the communication apparatus 110A (the communication apparatus 110 capable of providing wireless communication service or a master communication apparatus 110 in a master-secondary type), and then, start backhaul communication aiming at access to the communication control apparatus 130.

On the other hand, being under the control of the communication control apparatus 130 may include a case in which allowable communication parameters are also set for the purpose of primary system protection in the terminal or the communication apparatus 110B. However, the communication control apparatus 130 cannot know the position information of these apparatuses in advance. Further, these apparatuses are highly likely to have mobility. That is, the position information is dynamically updated. Depending on the legal system, re-registration in the communication control apparatus 130 may be obligatory when the position information changes a certain amount or more.

In consideration of such various use forms and operation forms of the terminal 120 and the communication apparatus 110, two types of communication parameters shown below are defined in the TVWS operation form (NPL 4) set by the Office of Communication (Ofcom).

Generic Operational Parameters

Specific Operational Parameters

Generic operational parameters are communication parameters defined in NPL 4 as "parameters that can be used by any slave WSD located within the coverage area of a predetermined master WSD (corresponding to the communication apparatus 110)". A feature is that it is calculated by a WSDB without using the location information of the slave WSD.

The generic operational parameters can be provided by unicast or broadcast from the communication apparatus 110 that has already received permission of radio wave transmission from the communication control apparatus 130. For example, a broadcast signal typified by the Contact Verification Signal (CVS) prescribed in the FCC Rule Part 15 Subpart H of United States can be used. Alternatively, the generic operational parameters may be provided by a broadcast signal specific to a wireless interface. This makes it possible for the terminal 120 or the communication apparatus 110B to treat this as a communication parameter used for radio wave transmission aiming at accessing the communication control apparatus 130.

Specific operational parameters are communication parameters defined in NPL 4 as "parameters that can be used by a specific slave white space device (WSD)". In other words, they are communication parameters calculated using device parameters of the slave WSD corresponding to the terminal 120. A feature is that it is calculated by a white space database (WSDB) using the location information of the slave WSD.

The CPE-CBSD handshake procedure defined in NPL 5 can be regarded as another form of a procedure for terminals. CPE-CBSD does not have a wired backhaul line and accesses the Internet via BTS-CBSD. Therefore, it is not possible to obtain a grant to transmit radio waves from an SAS for a CBRS band without special regulations and procedures. The CPE-CBSD handshake procedure allows the CPE-CBSD to transmit radio waves with the same maximum EIRP and minimum required duty cycle as those of a terminal (EUD) until it obtains a grant to transmit radio waves from the SAS. Accordingly, the communication apparatus 110B can construct a line for obtaining a grant to transmit radio waves from the communication control apparatus 130 by setting the transmission EIRP to the maximum EIRP of terminals and then performing wireless communication with the communication apparatus 110A at the minimum required duty cycle. After obtaining the grant to transmit radio waves, it is possible to use up to the maximum EIRP specified for communication devices within the range of grant.

<2.7 Procedures Generated Between Communication Control Devices>

<2.7.1 Information Exchange>

The communication control apparatus 130 can perform exchange of management information with other communication control apparatuses 130. At least, it is preferable for the following information to be exchanged.

Information related to the communication apparatus 110

Area information

Protection target system information

The information related to the communication apparatus 110 includes at least the registration information and communication parameter information of the communication apparatus 110 operating under permission of the communication control apparatus 130. Registration information for the communication apparatus 110 that does not have authorized communication parameters may also be included.

The registration information of the communication apparatus 110 is typically device parameters of the communication apparatus 110 registered in the communication control apparatus 130 in the registration procedure described above. Not all registered pieces of information is necessarily exchanged. For example, information that may correspond to personal information need not be exchanged. Further, when the registration information of the communication apparatus 110 is exchanged, the registration information may be encrypted and exchanged, or the information may be exchanged after the content of the registration information is made ambiguous. For example, information converted into a binary value or information signed using a digital signature mechanism may be exchanged.

The communication parameter information of the communication apparatus 110 is typically information related to communication parameters that are currently used by the communication apparatus 110. It is preferable for at least information indicating a use frequency and transmission power to be included. Other communication parameters may be included.

The area information is typically information indicating a predetermined geographical area. This information may include area information of various attributes in various aspects.

For example, like the PAL protection area (PPA) disclosed in NPL 2 (WINNF-TS-0112), the area information may include protection zone information of the communication apparatus 110 serving as a high priority secondary system. The area information in this case can be represented, for example, by a set of three or more coordinates indicating geographical positions. Further, for example, when the plurality of communication control apparatuses 130 can refer to a common external database, the area information can be represented by a unique ID, and the actual geographic area can be referenced from the external database using the ID.

Further, for example, information indicating a coverage of the communication apparatus 110 may be included. The area information in this case can also be represented, for example, by a set of three or more coordinates indicating geographical positions. Alternatively, for example, assuming that the coverage is a circle centered on the geographical position of the communication apparatus 110, this can also be represented by information indicating the size of a radius. Further, for example, when the plurality of communication control apparatuses 130 can refer to a common external database that records the area information, the information indicating the coverage can be represented by a unique ID, and actual coverage can be referenced by using the ID from the external database.

Further, as another aspect, information related to an area partition determined by a government or the like in advance can also be included. Specifically, for example, it is possible to indicate a certain area by indicating an address. Further, for example, a license area can be similarly expressed.

Further, as yet another aspect, the area information does not necessarily have to represent a two-dimensional area, and may represent a three-dimensional space. For example, this may be expressed using a spatial coordinate system. Further, for example, information indicating a predetermined closed space, such as the number of floors of a building, a floor, a room number, or the like, may be used.

The protection target system information is, for example, information of a wireless system treated as a protection target, such as the above-described existing layer (incumbent tier). Examples of a situation in which this information should be exchanged include a situation requiring cross-border coordination. In neighboring countries or regions, it is sufficiently conceivable that there are different protection targets in the same band. In such a case, the protection target system information may be exchanged between the different communication control apparatuses 130 in corresponding countries or regions, as necessary.

As another aspect, the protection target system information may include information on a secondary licensee, and information on a wireless system operated by the secondary licensee. The secondary licensee is specifically a licensee of a license, and for example, it is assumed that the secondary licensee borrows a PAL from a holder and operates the wireless system of the secondary licensee. When the communication control apparatus 130 independently performs lease management, the communication control apparatus 130 may exchange information on the secondary licensee and information on the wireless system operated by the secondary licensee with another communication control unit for the purpose of protection.

These pieces of information can be exchanged between the communication control apparatuses 130 regardless of the decision-making topology applied to the communication control apparatus 130.

Further, these pieces of information can be exchanged in a variety of ways. An example is shown hereinafter.

ID designation scheme

Period designation scheme

Area designation scheme

Dump scheme

The ID designation scheme is a scheme of obtaining information corresponding to the ID by using an ID assigned in advance to specify information managed by the communication control apparatus 130. For example, it is assumed that the communication apparatus 110 with ID: AAA is managed by a first communication control apparatus 130. In this case, a second communication control apparatus 130 designates an ID: AAA for the first communication control apparatus 130, and makes an information obtainment request. After the request is received, the first communication control apparatus 130 performs search for information of ID: AAA, and notifies of information on the communication apparatus 110 with ID: AAA, such as registration information communication parameter information, as a response.

The period designation scheme is a scheme in which information satisfying a predetermined condition can be exchanged in a specific designated period.

Examples of the predetermined condition may include whether information is updated. For example, when obtainment of the information on the communication apparatus 110 in the specific period is designated by a request, the registration information of the communication apparatus 110 newly registered within the specific period can be notified of in a response. Further, the registration information or communication parameter information of the communication apparatus 110 whose communication parameters have been changed within the specific period can also be notified of in a response.

Examples of the predetermined condition may include whether recording has been performed by the communication control apparatus 130. For example, when the obtainment of the information on the communication apparatus 110 in the specific period is designated by a request, the registration information or communication parameter information recorded by the communication control apparatus 130 in the period can be notified of in a response. When the information is updated in that period, latest information in the period may be notified of. Alternatively, an update history may be notified of for each piece of information.

In an area designation scheme, a specific area is designated, and information of the communication apparatus 110 belonging to the area is exchanged. For example, when obtainment of the information on the communication apparatus 110 in the specific area is designated by a request, the registration information or the communication parameter information of the communication apparatus 110 installed in the specific area can be notified of in a response.

The dump scheme is a scheme for providing all pieces of information recorded by the communication control apparatus 130. It is preferable for at least the information related to the communication apparatus 110 or the area information to be provided by using the dump scheme.

All the descriptions of the exchange of information between the communication control apparatuses 130 so far are based on a pull scheme. That is, this is a form in which information corresponding to the parameter designated by the request is returned as a response, and can be realized by an HTTP GET method as an example. However, it is not necessary to be limited to the pull scheme, and information may be actively provided to the other communication control apparatus 130 using the push scheme. The push scheme can be realized by an HTTP POST method, for example.

<2.7.2 Order and Request Procedure>

The communication control apparatuses 130 may perform a command or a request to each other. Specifically, one example may include the reconfiguration of the communication parameters of the communication apparatus 110. For example, when a decision is made that the first communication apparatus 110 managed by the first communication control apparatus 130 is receiving a great deal of interference from the second communication apparatus 110 managed by the second communication control apparatus 130, the first communication control apparatus 130 may request the second communication control apparatus 130 to change the communication parameters of the second communication apparatus 110.

Another example may include reconfiguration of the area information. For example, when there is a deficiency in calculation of coverage information or protection area information regarding the second communication apparatus 110 managed by the second communication control apparatus 130, the first communication control apparatus 130 may request the second communication control apparatus 130 to reconstruct the area information. In addition thereto, an area information reconstruction request may be made for various reasons.

<2.8 Information Transfer Means>

Notification (signaling) between entities described so far can be realized via various mediums. E-UTRA or 5G NR will be described by way of example. Of course, implementations are not limited to these.

<2.8.2 Signaling between Communication Control Apparatus 130 and Communication Apparatus 110>

Notification from the communication apparatus 110 to the communication control apparatus 130 may be performed, for example, in an application layer. For example, the notification may be implemented using Hyper Text Transfer Protocol (HTTP). Signaling can be performed by describing the required parameters in an HTTP message body according to a predetermined format. Further, when HTTP is used, notification from the communication control apparatus 130 to the communication apparatus 110 is also performed according to an HTTP response mechanism.

<2.8.3 Signaling between Communication Apparatus 110 and Terminal 120>

The notification from the communication apparatus 110 to the terminal 120 may be performed using, for example, at least one of radio resource control (RRC) signaling, system information (SI), and downlink control information (DCI). Further, there are, as downlink physical channels, PDCCH: Physical Downlink Control Channel, PDSCH: Physical Downlink Shared Channel, PBCH: Physical Broadcast Channel, NR-PDCCH, NR-PDSCH, NR-PBCH, and the like, but at least one of these may be used for implementation.

Notification from the terminal 120 to the communication apparatus 110 may be performed using, for example, radio resource control (RRC) signaling or uplink control information (UCI). Further, the notification may be performed using a physical uplink channel (PUCCH: Physical Uplink Control Channel, PUSCH: Physical Uplink Shared Channel, or PRACH: Physical Random Access Channel).

The signaling is not limited to physical layer signaling described above, but may be performed in a higher layer. For example, when the notification may be performed in the application layer, the signaling may be performed by describing the required parameters in the HTTP message body according to a predetermined format.

<2.8.4 Signaling between Terminals 120>

Figure 6:
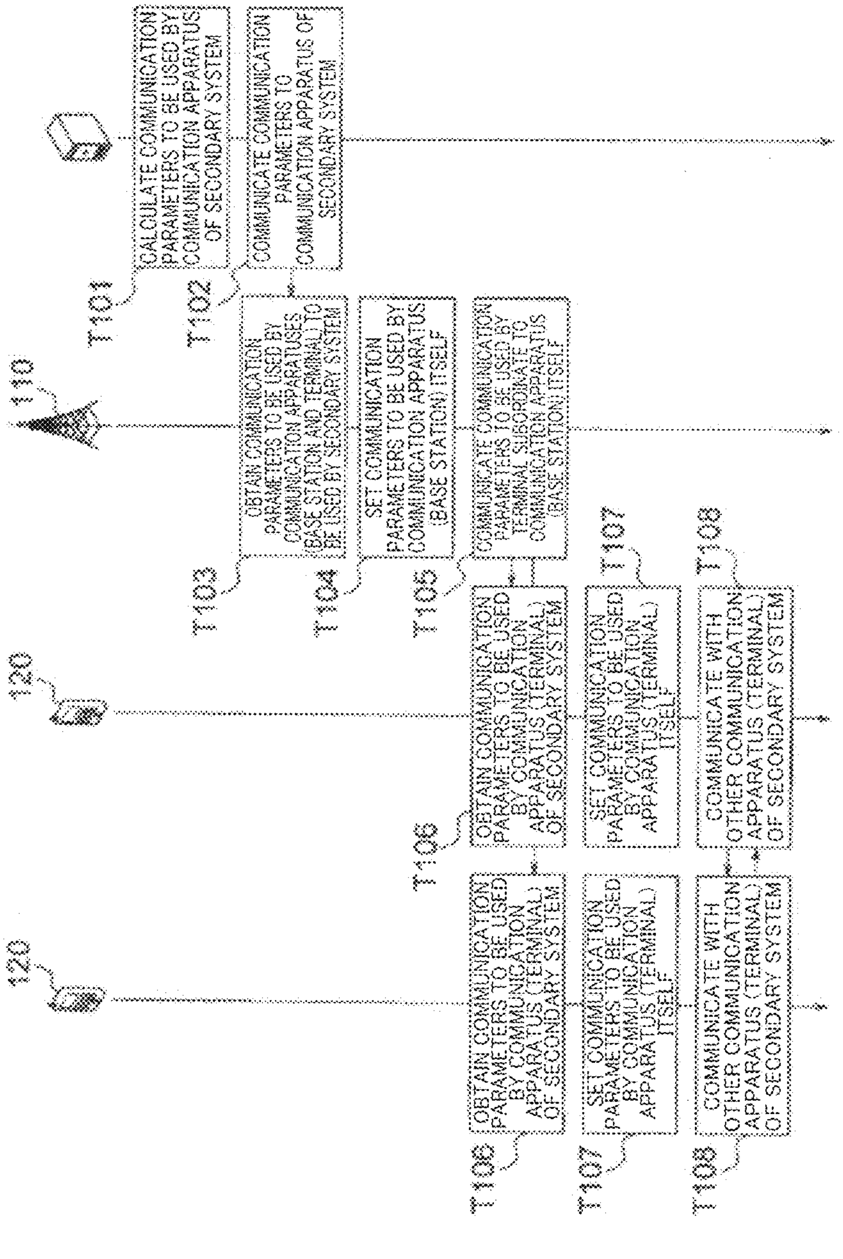
FIG. 6 is a diagram illustrating a flow of signaling between terminals.

An example of a flow of signaling in a case in which device-to-device (D2D) or vehicle-to-everything (V2X), which is communication between the terminals 120 is assumed as communication of the secondary system, is illustrated in FIG. 6. D2D or V2X, which is communication between the terminals 120, may be performed using a physical sidelink channel (PSCCH: Physical Sidelink Control Channel, PSSCH: Physical Sidelink Shared Channel, and PSBCH: Physical Sidelink Broadcast Channel). The communication control apparatus 130 calculates communication parameters to be used by the secondary system (T101) and notifies the communication apparatus 110 of the secondary system of the communication parameters (T102). A value of the communication parameter may be determined and notified, or conditions indicating a range of the communication parameter or the like may be determined and notified. The communication apparatus 110 obtains the communication parameters to be used by the secondary system (T103), and sets the communication parameters to be used by the communication apparatus 110 itself (T104). The terminal 120 is notified of communication parameters to be used by the terminal 120 under the control of the communication apparatus 110 (T105). Each terminal 120 under the control of the communication apparatus 110 obtains the communication parameters to be used by the terminal 120 (T106) and performs a setting (T107). Then, communication with another terminal 120 of the secondary system is performed (T108).

Communication parameters in a case in which a target frequency channel for spectrum access is used in a sidelink (direct communication between the terminals 120) may be notified in a form associated with a resource pool for a sidelink in the target frequency channel, obtained, or set. The resource pool is a radio resource for a sidelink set by a specific frequency resource or time resource. Examples of the frequency resources include a resource block and a component carrier. Examples of the time resources include a radio frame, a subframe, a slot, and a mini-slot. When a resource pool is set in a frequency channel that is a spectrum access target, the communication apparatus 110 sets the resource pool in the terminal 120 on the basis of at least one of RRC signaling, the system information, and the downlink control information. The communication apparatus 110 also sets the communication parameters to be applied in the resource pool and the sidelink, in the terminal 120, on the basis of at least one of the RRC signaling from the communication apparatus 110 to the terminal 120, the system information, and the downlink control information. The notification of a resource pool setting and the notification of communication parameters to be used in a sidelink may be performed at the same time or separately.

3. Embodiments of Present Invention

In the following, a CBRS communication system will be assumed as the communication system that is the subject of the present embodiment. However, the present invention is not limited to being applied to CBRS, and can also be applied to other types of communication systems. In this case, the present invention can be carried out by substituting the terms, techniques, means, methods, algorithms, and the like referred to in the following descriptions for their equivalents and those from which the same effects can be achieved.

Figure 7:
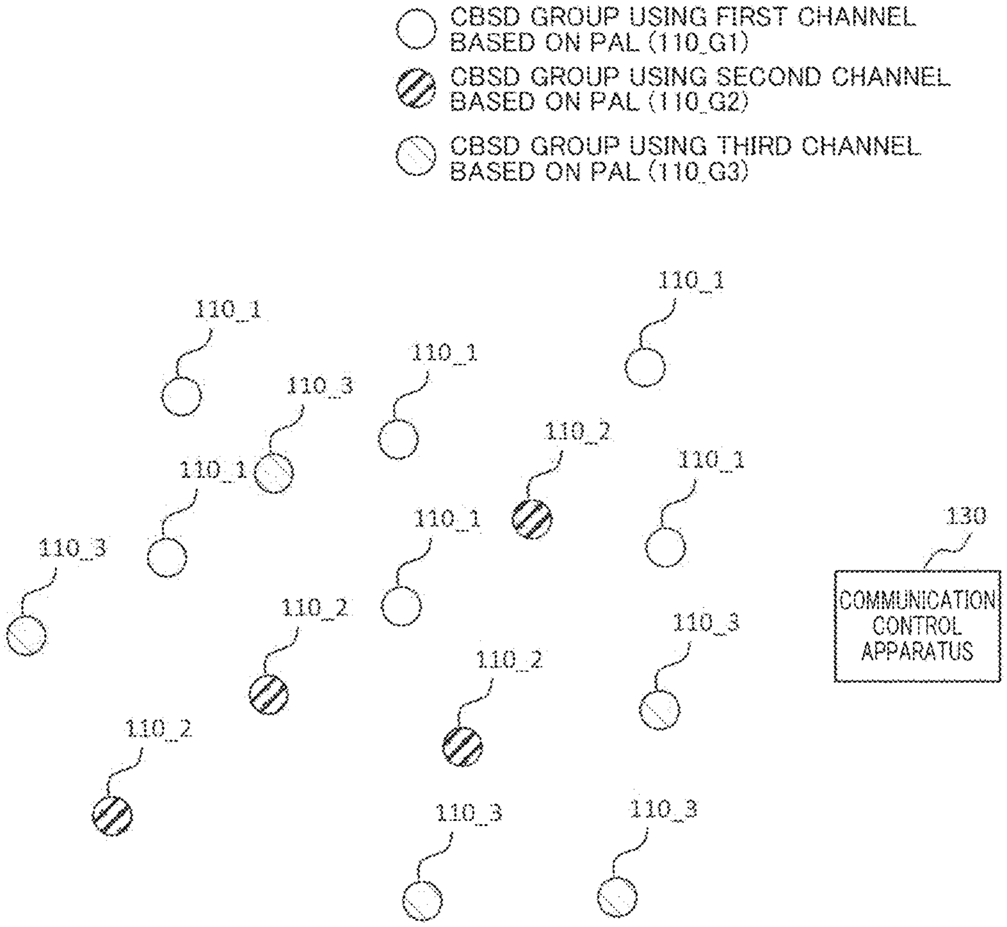
FIG. 7 is a block diagram illustrating the overall configuration of a communication system according to an embodiment.

FIG. 7 is a block diagram illustrating the overall configuration of a communication system according to the present embodiment. The communication system in FIG. 7 includes a plurality of the communication apparatuses 110 (110_1, 110_2, and 110_3) and the communication control apparatus 130. The communication apparatus 110 corresponds to a Citizens Broadband Radio Service Device (CBSD) defined in the Citizens Broadband Radio Service (CBRS), and the communication control apparatus 130 corresponds to a Spectrum Access System (SAS) defined in the CBRS. Hereinafter, the communication apparatus 110 will be described as being a CBSD, and the SAS 130 as being a SAS.

In FIG. 7, three CBSD groups are provided, namely, a CBSD group 100_G1, a CBSD group 110_G2, and a CBSD group 110_G3. These CBSD groups correspond to first to N-th communication apparatus groups (in this example, N=3). The CBSD group 110_G1 includes a plurality of CBSDs 110_1, the CBSD group_G2 includes a plurality of CBSDs 110_2, and the CBSD group_G3 includes a plurality of CBSDs 110_3. Although N=3 in the example in FIG. 7, N may be 2 or less, or 4 or more. Although a plurality of CBSDs belong to each CBSD group, it is sufficient to have at least one CBSD. The CBSD groups 100_G1 to 110_G3 are located within the PAL license area held by PAL holders X1 to X3. A "PAL" is an authorization to use radio waves in the license area with priority over General Authorized Access (GAA). The PAL holders X1 to X3 may be different operators from each other, or some or all of the PAL holders X1 to X3 may be the same operator. The PAL holder X1 may be the same as or different from the carrier of the CBSD 110_1, the PAL holder X2 may be the same as or different from the carrier of the CBSD 110_2, and the PAL holder X3 may be the same as or different from the carrier of the CBSD 110_3.

Based on the PAL held by the PAL holder X1, each CBSD 110_1 in the CBSD group 110_G1 uses a first frequency (a first channel) of the plurality of frequencies subject to the PAL as the primary channel. Based on the PAL held by the PAL holder X2, each CBSD 110_2 in the CBSD group 110_G2 uses a second frequency (a second channel) of the stated plurality of frequencies as the primary channel. Based on the PAL held by the PAL holder X3, each CBSD 110_3 in the CBSD group 110_G3 uses a third frequency (a third channel) of the stated plurality of frequencies as the primary channel.

The term "CBSD 110" will be used when not making any particular distinction between the CBSDs 110_1, 110_2, and 110_3.

The CBSDs 110_1, 110_2, and 110_3 are capable of using the first to third channels, respectively, as the primary channels to communicate with other devices in the license area (the terminal 120, the other CBSDs, and the SAS 130, in FIG. 1).

The communication of the plurality of CBSDs 110_1 is protected from interference by the SAS 130 based on the PAL of the PAL holder X1.

Interference is, for example, interference from a device (a terminal device, another CBSD) that performs General Authorized Access (GAA). GAA corresponds to the use of radio waves based on authorization to use radio waves at a lower priority than the PAL. The communication of the plurality of CBSDs 110_2 is protected from interference by the SAS 130 based on the PAL of the PAL holder X2. The communication of the plurality of CBSDs 110_3 is protected from interference by the SAS 130 based on the PAL of the PAL holder X3. More specifically, for each CBSD group, the SAS 130 forms a PAL Protection Area (PPA) for the primary channel to protect the communication within the PPA from interference from outside the PPA. Although only one SAS 130 is illustrated in FIG. 7, another SAS capable of communicating with the SAS 130 may be provided. Note that each CBSD 110 can be used by obtaining prior permission from the SAS 130 to use the primary channel based on the PAL (also referred to as a "PAL grant" or simply a "grant", which will be described below). Before obtaining permission to use the primary channel, each CBSD 110 can communicate with the SAS 130 or the like using a predetermined channel, a GAA channel, or the like.

Figure 8:
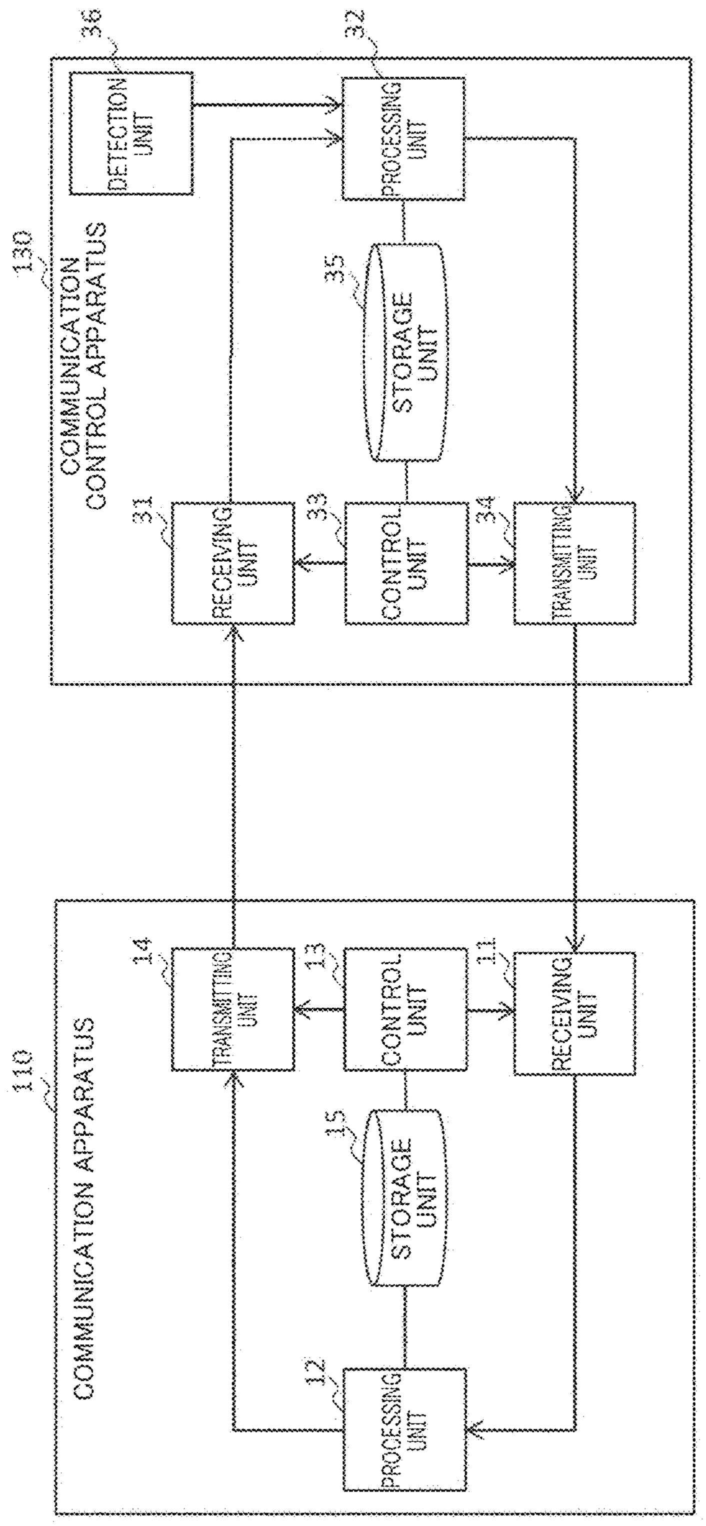
FIG. 8 is a block diagram illustrating a CBSD (communication apparatus) and a SAS (a communication control apparatus).

FIG. 8 is a block diagram illustrating the CBSD 110 (the communication apparatus) and the SAS 130 (the communication control apparatus). The CBSDs 110_1, 110_2, and 110_3 illustrated in FIG. 7 and described earlier all have the configuration illustrated in FIG. 8.

The SAS 130 includes a receiving unit 31, a processing unit 32, a control unit 33, a transmitting unit 34, a storage unit 35, and a detection unit 36. The transmitting unit 34 and the receiving unit 31 each includes at least one antenna. The transmitting unit 34 performs processing for transmitting signals, wirelessly or over wires, with the CBSD 110 and another SAS 130. The receiving unit 31 performs processing for receiving signals, wirelessly or over wires, with the CBSD 110 and another SAS 130. The combination of the transmitting unit 34 and the receiving unit 31, or one of the transmitting unit 34 and the receiving unit 31, corresponds to a communication unit that communicates with the CBSD 110. The control unit 33 controls the SAS 130 as a whole by controlling each element in the SAS 130.

Various types of information necessary for communication with the CBSD 110 and the other SAS 130 is stored in the storage unit 35 of the SAS 130 in advance. As an example, information on the registered CBSD 110 is stored in the storage unit 35, e.g., the ID, position information, maximum transmission power information (an EIRP capability value, a maximum conducted power, or the like), beam pattern information (beam motion range information), antenna transmission power (conducted power) information, and the like of the CBSD 110. In addition, information of the grant given to the CBSD 110 may be stored in the storage unit 35. The grant corresponds to permission to use the channel. Types of grants include PAL-based grants (PAL grants), GAA grants, and the like. Examples of the information of the grant include a frequency (a channel), a transmission power value, a beam pattern permitted to be used, and the like.

The detection unit 36 detects a change in incumbent activity. Specifically, the detection unit 36 detects the use of radio waves by an incumbent (protected system), such as military radar or the like. The protected system is a system that has a higher priority for radio wave use than a PAL. If the radio wave use by the protected system is detected to have been started, the detection unit 36 provides detection information indicating that the radio wave use has been started (start detection information) to the processing unit 32. The start detection information may include information indicating the channel on which the radio wave use has been started. The detection unit 36 provides the start detection information to the processing unit 32. In addition, if the end of radio wave use is detected as a change in the incumbent activity, the detection unit 36 provides detection information indicating that the radio wave use has ended (end detection information) to the processing unit 32. The end detection information may include information on the channel on which the radio wave use has ended.

The processing unit 32 performs various processing according to the present embodiment. For example, the processing unit 32 performs processing related to the registration procedure, the spectrum inquiry procedure, and the spectrum grant procedure with the CBSD 110.

For example, in the spectrum use inquiry procedure, the processing unit 32 transmits primary channel information (first to N-th primary channel information) to the CBSDs 110_1 to 110_3 belonging to each of the CBSD groups 110_G1 to 110_G3 (the first to N-th communication apparatus groups). The primary channel information transmitted to the CBSDs 110_1 to 110_3 includes candidates for channels that the CBSDs 110_1 to 110_3 can use with priority as the primary channel based on the PAL. Similarly, the processing unit 32 transmits secondary channel information (first to N-th secondary channel information) to each of the CBSDs 110_1 to 110_3 (first to N-th communication apparatuses), including candidates for secondary channels that can be assigned to the CBSDs 110_1 to 110_3. The channel candidates in the secondary channel information are different from the channel candidates in the primary channel information.

The processing unit 32 receives, from the CBSDs 110_1 to 110_3 (the first to N-th communication apparatuses) that received the primary channel information, a first request requesting permission to use a channel based on the PAL (a PAL grant request) in the spectrum grant procedure, for example. Based on the PAL grant request received from the CBSDs 110_1 to 110_3, the processing unit 32 determines a channel to be granted to the CBSDs 110_1 to 110_3 from among the plurality of channels communicated in the corresponding items of the primary channel information. The channels granted to the CBSDs 110_1 to 110_3 correspond to channels that the CBSDs 110_1 to 110_3 use as primary channels (first to N-th channels).

Similarly, the processing unit 32 receives, from the CBSDs 110_1 to 110_3 (the first to N-th communication apparatuses) that received the secondary channel information, a second request requesting the assignment of secondary channels. The second request may, for example, take the form of a request to issue a GAA grant. Based on the received second request, the processing unit 32 determines secondary channels to be assigned to the CBSDs 110_1 to 110_3 from among the channels communicated to the CBSDs 110_1 to 110_3 in the secondary channel information.

The processing unit 32 transmits, as a response to the first request, a response (a first response) including information of the primary channels (the first to N-th channels) that are the channels granted to the CBSDs 110_1 to 110_3 (the first to N-th communication apparatuses). The processing unit 32 transmits, as a response to the second request, a response (a second response) including information of the secondary channel assigned to the CBSDs 110_1 to 110_3 (the first to N-th communication apparatuses). The first response and the second response may be included in the same response message.

In addition, based on the radio wave use start detection information from the detection unit 35, the processing unit 32 detects the CBSD group using the channel on which the radio wave use has been started (a target channel) as the primary channel. According to the usage conditions of the secondary channel assigned to each CBSD of the detected CBSD group, the processing unit 32 performs processing for transitioning the channel (primary channel) used by each CBSD in the detected CBSD group to the secondary channel. The processing unit 32 performs processing for stopping the use of the primary channel by each CBSD in the detected CBSD group (including both CBSDs transitioned to the secondary channels and CBSDs not transitioned to the secondary channels).

In other words, based on the usage conditions, the processing unit 32 determines whether the channel used by each CBSD in the detected CBSD group can be transitioned from the primary channel to the secondary channel. The processing unit 32 determines that it is possible to transition to the secondary channel if the usage conditions are met. In this case, the processing unit 32 performs processing for transitioning the channel used by the CBSD to the secondary channel. Regardless of whether the transition to the secondary channel is possible, the processing unit 32 performs processing for stopping the use of the primary channel for each CBSD in the detected CBSD group.

An example of the usage conditions will be given here. When there are a plurality of target channels on which radio wave use is detected, the processing unit 32 determines that the usage conditions are met if the secondary channels assigned to the plurality of CBSD groups using the target channels are different from each other. If at least two of the secondary channels assigned to the plurality of CBSD groups are the same, the processing unit 32 determines that the usage conditions are not met. In this case, the processing unit 32 determines that the channel being used (the primary channel) cannot be transitioned to the secondary channel for any of the CBSDs belonging to the plurality of CBSD groups.

It is assumed that the total number of secondary channels assigned to the CBSDs in the plurality of CBSD groups (the first to N-th communication apparatus groups) based on PALs (the authorization to preferentially use radio waves) is X. In this case, the secondary channels may be assigned such that, of the primary channels assigned to the plurality of CBSD groups (the first to N-th channels), the secondary channels of the X CBSD groups using any X channels adjacent (closest) in the frequency access direction are different from each other. Since it is rare for incumbent radio waves to be transmitted over X or more consecutive channels (frequencies), such an assignment method makes it possible to increase the likelihood of successfully transitioning to the secondary channels.

In addition, a list of CBSDs, among the plurality of CBSDs belonging to the CBSD group, that are transitioned to the secondary channel when the primary channel can no longer be used may be prepared (a secondary PPA cluster list, described later, may be used) for each PAL holder. The processing unit 32 may select the CBSDs included in this list as CBSDs that meets the usage conditions, and make those CBSDs subject to the transition to the secondary channel. CBSDs not included in the list are taken as CBSDs that do not meet the usage conditions, and are not subject to the transition to the secondary channel.

An example will be described of a specific method by which the processing unit 32 transitions the channels used by a CBSD group, which is using the target channel on which the protected system has started radio wave transmission, to the secondary channel. The channel type of the primary channels and the channel type of the secondary channels may be defined, and the channel transitions may be performed by changing these channel types. For example, the processing unit 32 sets the channel type of the primary channels (the first to N-th channels) of the CBSD groups 110_G1 to 110_G3 to a first type that uses radio waves at a first priority (e.g., a name such as "PAL type" may be defined). The secondary channels assigned to the CBSD groups 110_G1 to 110_G3 are set to a second type that uses radio waves at a second priority lower than the first priority (e.g., a name such as "GAA type" may be defined). The processing unit 32 transmits information including the channel type settings for the primary channels and the secondary channels to each CBSD in the CBSD groups 110_G1 to 110_G3. When the processing unit 32 transitions the channels used by the CBSDs in the CBSD group subject to the channel transition to the secondary channels, in the channel transition processing, the channel type of the used channel from before the transition (the primary channel) is set to the second type, and the channel type of the secondary channel for after the transition (the primary channel) is set to the first type. The processing unit 32 transmits information including the changed channel type settings for the primary channels and the secondary channels, respectively, to the CBSDs, e.g., in a heartbeat procedure response. This makes it possible to switch channels at high speeds.

If the radio wave use end detection information is received from the detection unit 36, the processing unit 32 may perform processing for returning the channels used by the CBSDs in the CBSD group that have transitioned to the secondary channels from the secondary channels to the primary channels. The primary channels to be returned to are the same as the channels used before the transition to the secondary channels, but the channels may be returned to different channels. The processing unit 32 sets the channel type of the secondary channel from before the return to the second type, sets the channel type of the primary channel for after the return to the first type, and transmits information including the changed channel type settings to the CBSDs in the CBSD group, e.g., in a heartbeat procedure response. For CBSDs in the CBSD group that have not transitioned to the secondary channel, the processing unit 32 may allow the use of the primary channel again. This makes it possible to switch channels (return to the primary channels) at high speeds.

Based on the list of CBSDs provided for each PAL holder, the processing unit 32 creates a PAL protection area (PPA) to protect the CBSDs from interference. The PPA corresponds to an area that integrates the ranges (coverages) based on the power values at which radio waves can be transmitted in the CBSD groups included in the list, i.e., the shape of an aggregate of the coverages thereof. More specifically, the PPA is calculated based on, for example, the position information, EIRP capability, antenna pattern information (antenna gain), horizontal azimuth angle, and the like of the CBSDs. "EIRP" is the maximum equivalent isotropic radiated power. One PPA is constructed by calculating an area where the radio wave strength meets a predetermined value (e.g., −96 dBm/10 MHz) for each CBSD and then combining all the calculated areas. Within the constructed PPA, protection processing is performed such that the cumulative interference power level from other CBSDs outside the PPA does not exceed a predetermined value (e.g., −80 dBm/10 MHz).

The processing unit 32 may receive the list of CBSDs from the PAL holder devices, or may receive CBSD group information from at least one of the CBSDs. Communication among the CBSDs in the PPA is protected from communication from outside the area (including low-priority communication such as GAA).

In the present embodiment, the processing unit 32 creates a PPA for the primary channels (a primary PPA) and a PPA for the secondary channels (a secondary PPA) as PPAs. The list for creating the PPA for the primary channels is called a primary PPA cluster list, and the list for creating the PPA for the secondary channels is called a secondary PPA cluster list. The content of the primary PPA cluster list may be the same as, or different from, the content of the secondary PPA cluster list. In other words, the CBSDs included in the primary PPA cluster list may be the same as the CBSDs included in the secondary PPA cluster list, or only some of the CBSDs included in the primary PPA cluster list may be included in the secondary PPA cluster list.

More generally, the lists of CBSDs included in each of the first to N-th CBSD groups (the communication apparatus groups) using the first to N-th channels as the primary channels (that is, the primary PPA cluster list) correspond to first to N-th primary lists. Of the CBSDs included in each of the first to N-th CBSD groups, lists of CBSDs to be transitioned to the secondary channels (that is, the secondary PPA cluster list) correspond to first to N-th secondary lists. The processing unit 32 calculates first to N-th primary protected areas (primary PPAs) that combine the coverages based on the power values at which one or more CBSDs included in the first to N-th primary lists can transmit radio waves. The processing unit 32 calculates first to N-th secondary protected areas (secondary PPAs) that combine the coverages based on the power values at which one or more CBSDs included in the first to N-th secondary lists can transmit radio waves.

If each CBSD in the CBSD group is using a primary channel, the SAS 130 performs interference protection based on the primary PPA created for that CBSD group (the SAS 130 does not apply interference protection according to the secondary PPA). If each CBSDs (some or all of the CBSDs) in the CBSD group is using a secondary channel, the secondary PPA created for that CBSD group is applied to perform interference protection (it is assumed that the SAS 130 still applies the interference protection according to the primary PPA, but it is acceptable for such protection not to be applied). In order to implement interference protection in the primary PPA and the secondary PPA, it is necessary to calculate the interference protection for the primary PPA and the secondary PPA in advance according to Coordinated Periodic Activities among SASs (CPAS) (described later). As an example of the calculation of interference protection, a transmission power value, a beam pattern, or the like acceptable to other CBSDs outside the PPA may be calculated. In addition, the calculation of the transmission power values or beam patterns for protecting the incumbent (protected system) from interference may be performed for each CBSD belonging to the PPA. Before performing these calculations, the processing unit 32 may exchange the primary PPA and the secondary PPA with other SASs. The processing unit 32 stores the result of calculating the interference protection for each PPA in the storage unit 35.

The processing unit 32 performs Coordinated Periodic Activities among SASs (CPAS) with one or more other SASs. CPAS is processing that an SAS performs once every 24 hours with one or more other SASs. In CPAS, calculation processing related to higher-tier protection of incumbent and similar protected systems (e.g., military radar) (that is, calculation processing to protect higher tiers from lower-tier interference), calculation for protection in the PPAs (primary PPAs and secondary PPAs), and the like are performed. In the calculation processing involved in the higher-tier protection, calculations are performed to protect the protected entity from interference from lower tiers that have lower priority for radio wave use than the protected entity. Each CBSD in each CBSD group (i.e., PAL or GAA) has a lower priority for the use of radio waves than an incumbent (a protected system).

More generally, as protection calculations for the PPAs, the processing unit 32 performs protection calculations for the primary PPA (primary protected area) and protection calculations for the secondary PPA (secondary protected area) in the CPAS. The processing unit 32 stores the result of the protection calculation for the primary protected area and the result of the protection calculation for the secondary protected area in the storage unit 35. At least the result of the protection calculation for the secondary protected area is stored in the storage unit 35. Based on the result of the protection calculation for the primary PPA, the processing unit 32 performs protection for interference from outside the primary PPA for the CBSD group. When the channel used by the CBSD group is transitioned from the primary channel to the secondary channel, the processing unit 32 performs protection for the CBSD group from interference from outside the secondary PPA based on the result of the protection calculation for the secondary PPA stored in the storage unit 32. This makes it possible to quickly implement the interference protection for the secondary channel (without waiting for the next CPAS) even after transitioning the primary channel to the secondary channel.

In addition to the processing described above, processing described later as being performed by the SAS 130 in the present embodiment is performed by the processing unit 32 of the SAS 130.

The CBSD 110 includes a receiving unit 11, a processing unit 12, a control unit 13, a transmitting unit 14, and a storage unit 15. The transmitting unit 14 and the receiving unit 11 each includes at least one antenna. The transmitting unit 14 performs processing for transmitting signals, wirelessly or over wires, with the SAS 130 and another CBSD 110. The receiving unit 11 performs processing for receiving signals, wirelessly or over wires, with the SAS 130 or another CBSD 110. The control unit 13 controls the CBSD 110 as a whole by controlling each element in the CBSD 110. For example, the control unit 13 may control beamforming by the transmitting unit 14 based on a beam pattern to be used among a plurality of available beam patterns. The combination of the receiving unit 11 and the transmitting unit 14, or one of the receiving unit 11 and the transmitting unit 14, corresponds to a communication unit that communicates with the SAS 130.

Various types of information necessary for communication with the SAS 130 or another CBSD 110 is stored in the storage unit 15 of the CBSD 110 in advance. In addition, the storage unit 15 holds information on the various capabilities, specifications, and the like of the CBSD 110. For example, the ID, position information, maximum transmission power information (an EIRP capability value, a maximum conducted power, or the like), dynamic beam pattern information (beam motion range information), antenna transmission power (conducted power) information, and the like of the CBSD 110 are stored in the storage unit 15. The PAL grant issued by the SAS 130, the information of the primary channel, and the information of the secondary channel assigned by the SAS 130 may be stored in the storage unit 15. In addition, when the SAS 130 makes the channel type settings described above for the primary channel and the secondary channel, the information of the channel type set for the primary channel and the secondary channel may be stored in the storage unit 15. In this case, the setting of the channel type enables the CBSD 110 (the processing unit 12) to determine which channel is the channel to which the PAL grant has been given (whether the channel is permitted to be used by the SAS 130).

The processing unit 12 performs various processing according to the present embodiment. For example, the processing unit 12 performs processing related to the various procedures described above, e.g., the registration procedure, the spectrum inquiry procedure, and the spectrum grant procedure, with the SAS 130.

For example, in the spectrum use inquiry procedure, the processing unit 12 receives the primary channel information from the SAS 130. The primary channel information includes candidates for channels that the CBSD 110 can use with priority as the primary channel based on the PAL. Likewise, the processing unit 12 receives the secondary channel information including candidates for the secondary channel that can be assigned to the CBSD 110.

In the spectrum grant procedure, the processing unit 12 transmits a first request requesting permission to use a channel based on the PAL (a PAL grant request), for example. The processing unit 12 transmits a second request requesting the assignment of the secondary channel. The second request may, for example, take the form of a request for a GAA grant. The first request and the second request may be included in the same message.

The processing unit 12 receives, as a response to the first request, a response (a first response) including information of the primary channels that are the channels granted from the SAS 130. The processing unit 12 receives, as a response to the second request, a response (a second response) including information of the secondary channel assigned by the SAS 130, i.e., a backup channel. The first response and the second response may be included in the same response message.

The processing unit 12 specifies, based on the first response, a primary channel permitted by the used by the apparatus itself (the CBSD), and specifies a secondary channel assigned to the apparatus itself as a backup. The processing unit 12 may store the information of the specified primary channel and secondary channel in the storage unit 15.

If instructed to stop using the primary channel by the SAS 130, e.g., in a heartbeat procedure response, the processing unit 12 stops using the primary channel. If an instruction to transition to the secondary channel is received from the SAS 130, the processing unit 12 performs processing for transitioning the channel being used to the secondary channel. The processing unit 12 stops using the primary channel.

If, as the specific method for transitioning the channel used (the primary channel) to the secondary channel, the channel type of the primary channel and the channel type of the secondary channel are changed as described above, the processing unit 12 performs processing for transitioning the channels based on the details of the channel type change included in the response from the SAS 130. For example, if, in a response from the SAS 130, the channel type of the primary channel is set to the second type (e.g., "GAA type") and the channel type of the secondary channel is set to the first type (e.g., "PAL type"), the processing unit 12 transitions from the primary channel to the secondary channel. Then, if, in yet another heartbeat procedure response, the channel type of the secondary channel is set to the second type and the channel type of the primary channel is set to the first type, the processing unit 12 performs processing for returning the channel used to the primary channel. This makes it possible to switch channels at high speeds.

The processing described later as being performed by the CBSD 110 is performed by the processing unit 12. The processing by the processing unit 12 will be described in detail later.

Each processing block of the SAS 130 and the CBSD 110 is implemented by hardware circuitry, software (a program or the like), or both. The storage unit 35 and the storage unit 15 are constituted by any desired storage device such as a memory device, a magnetic storage device, an optical disk, or the like. The storage unit 35 and the storage unit 15 may be connected by wires or wirelessly to the SAS 130 and the CBSD 110 from the exterior, rather than being provided within the SAS 130 and the CBSD 110. The transmitting unit 34 and the receiving unit 31 in the SAS 130, and the transmitting unit 14 and the receiving unit 11 in the CBSD 110, may include one or a plurality of network interfaces according to the number or types of networks to which a connection can be made.

The present embodiment will be described in greater detail hereinafter with reference to a specific example.

[Basic Policy]

A basic policy of the present embodiment will be described next. Each of CBSD groups including one or more PAL holders is permitted to use a different channel based on the PAL, and uses the permitted channel (PAL channel) as the primary channel. In other words, each PAL holder is authorized by the SAS to exercise its rights based on the PAL, and is permitted to use the channel as the primary channel (that is, is given a PAL grant by the SAS). Assume that a change in incumbent activity (the start of radio wave transmission by the incumbent) occurs simultaneously in a plurality of primary channels at a given time. It is necessary for the CBSD of the PAL holder for which the incumbent activity has changed on the primary channel to stop transmitting radio waves. The basic policy is that when the secondary channel assigned to the PAL holder for which the incumbent activity has changed on the primary channel is different among the PAL holders, those PAL holders are permitted to exercise their PAL rights on the secondary channel (the SAS gives a PAL grant for the secondary channel). In other words, transitioning from the primary channel to the secondary channel is permitted. The secondary channel is a PAL channel. On the other hand, if the secondary channel is the same among at least some PAL holders, none of those PAL holders are permitted to exercise their PAL rights on the secondary channel. Here, a case is assumed in which the number of channels in which a change in the incumbent activity occurs (target channels) is at least two, and is not greater than the number of free secondary channels (the number of secondary channels for which a PAL grant has not yet been given). The basic policy will be described in detail hereinafter with reference to a specific example.

Figure 9:
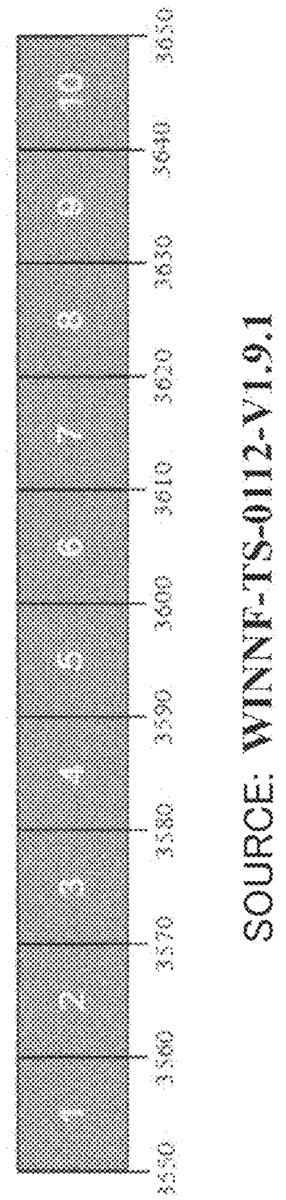
FIG. 9 is a diagram illustrating an example of channel arrangement with respect to a PAL.

FIG. 9 illustrates an example of the arrangement of channels with respect to PALs in a given license area. Ten consecutive channels having 10-MHz widths are provided. Of the ten channels, up to seven channels are assigned to one or more PAL holders as the primary channels for a single county (license area). For example, up to four channels may be assigned for a single PAL holder. The PAL holder has the right to receive an assignment of and use at least one channel based on the PAL. Note that it is not necessary to decide which of the ten channels can be used in advance. It is also not necessary to decide which channel the secondary channel is in advance.

Figure 10:
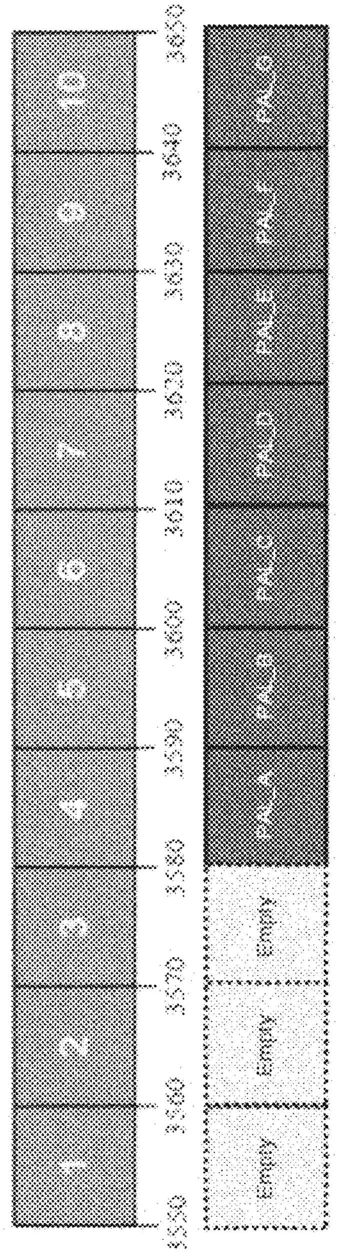
FIG. 10 is a diagram illustrating an example of mapping primary channels for seven PALs.
Figure 12A:
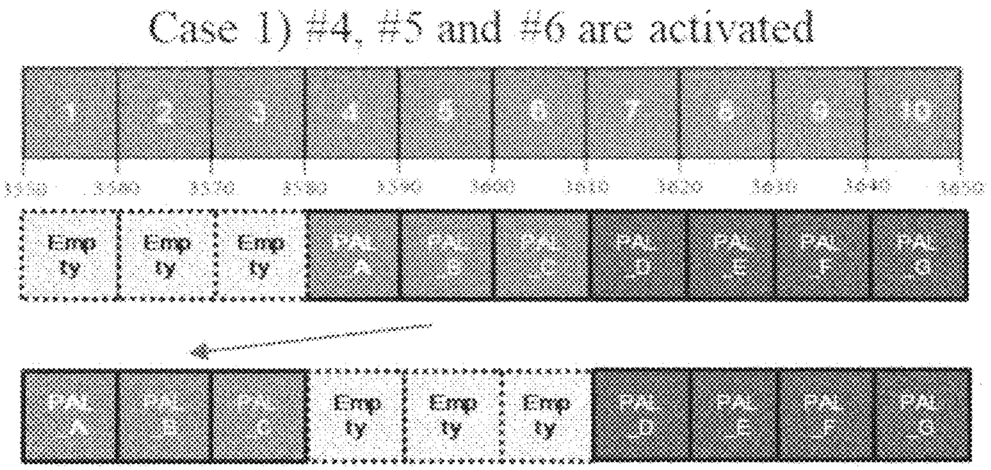
FIG. 12A is a diagram illustrating an example of transitioning from a primary channel to a secondary channel.
Figure 12B:
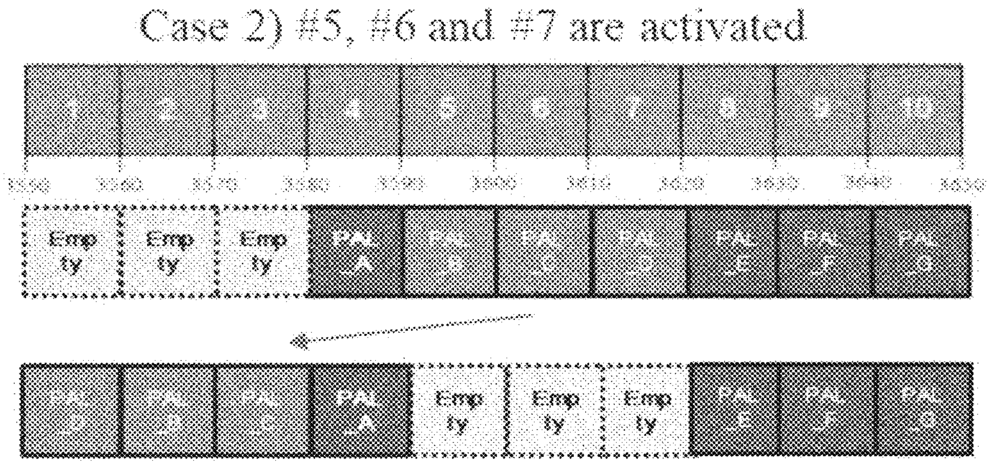
FIG. 12B is a diagram illustrating an example of transitioning from a primary channel to a secondary channel.
Figure 12C:
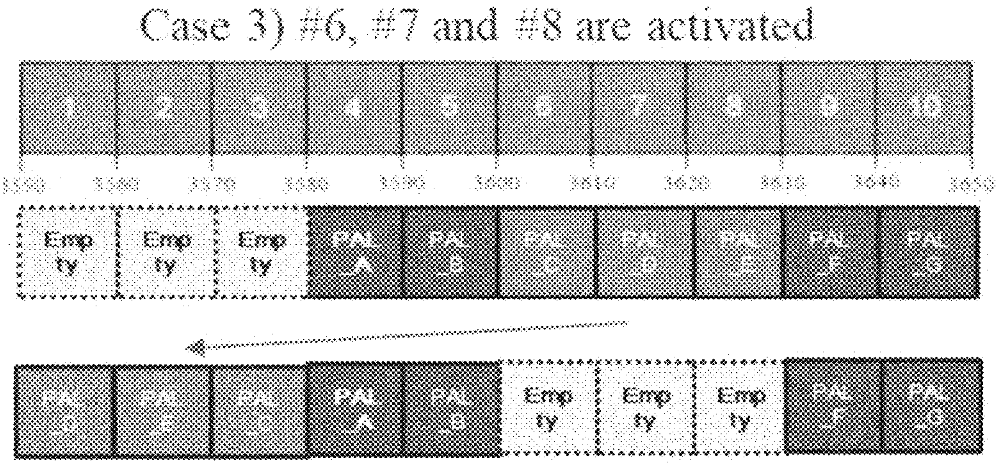
FIG. 12C is a diagram illustrating an example of transitioning from a primary channel to a secondary channel.
Figure 12D:
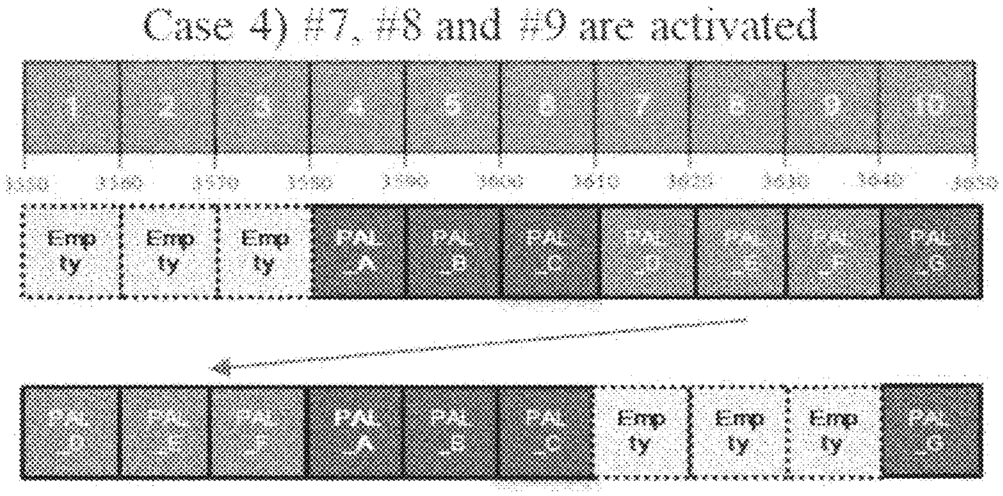
FIG. 12D is a diagram illustrating an example of transitioning from a primary channel to a secondary channel.
Figure 12E:
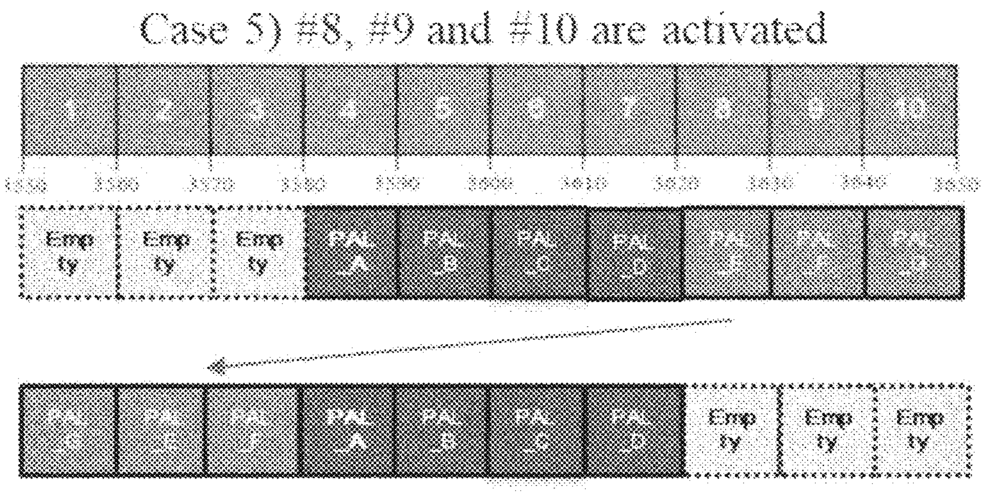
FIG. 12E is a diagram illustrating an example of transitioning from a primary channel to a secondary channel.

FIG. 10 illustrates an example of the mapping of primary channels for seven PALs (PAL_A, PAL_B, PAL_C, PAL_D, PAL_E, PAL_F, and PAL_G). Channels 4 to 10 are assigned as the primary channels. In other words, this example assumes that there are seven (N=7) CBSG groups that use channels 4 to 10 as the primary channels. A situation is possible where two or more of the seven PALs are PALs of the same PAL holder. It is also possible for all the PAL holders of the seven PALs to be different. The remaining channels not assigned as primary channels, i.e., channels 1, 2, and 3, are free channels that can be assigned as secondary channels for each PAL.

Changes in incumbent activity are assumed to occur only within a range of one to three consecutive channels, inclusive. In terms of assigning the secondary channels, based on this assumption, the likelihood of conflict between the secondary channels among the PALs can be minimized by sequentially and cyclically assigning the free channels (secondary channels) in the order of the primary channel numbers.

FIG. 11 is a diagram illustrating an example of an assignment pattern for secondary channels for each of PALs. Channel 1 for PAL_A, channel 2 for PAL_B, channel 3 for PAL_C, channel 1 for PAL_D, channel 2 for PAL_E, channel 3 for PAL_F, and channel 1 for PAL_G are assigned as the secondary channels.

FIGS. 12A, 12B, 12C, 12D, and 12E illustrate examples of applying the pattern of FIG. 11 to transition from the primary channels to the secondary channels. In the example in FIG. 12A, an incumbent activity change occurs on channels 4 to 6, which are primary channels, and the channels of PAL_A, PAL_B, and PAL_C (the primary channels 4 to 6) are transitioned to channels 1 to 3, which are secondary channels. In this case, the primary channels on which the incumbent activity has changed can be transitioned to the secondary channels without conflict. FIGS. 12B, 12C, 12D, and 12E also illustrate that a change in incumbent activity occurs over a range of three consecutive primary channels. In either case, as in FIG. 12A, the primary channels on which the incumbent activity has changed can be transitioned to the secondary channels without conflict.

Figure 13:
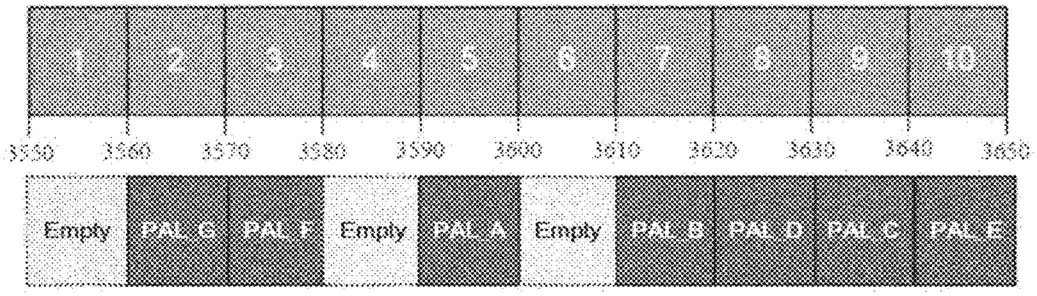
FIG. 13 is a diagram illustrating another example of mapping primary channels for seven PALs.

FIG. 13 illustrates another example of the mapping of primary channels for seven PALs (PAL_A, PAL_B, PAL_C, PAL_D, PAL_E, PAL_F, and PAL_G). Channels 2, 3, 5, and 7 to 10 are assigned as the primary channels. Channels 1, 4, and 6 are free channels that can be assigned as secondary channels for each PAL. In this example, the free channels 1, 4, and 6 are assigned as secondary channels for each PAL. In this case too, the likelihood of conflict can be minimized by assigning the secondary channels according to a policy similar to that described above. A specific example will be given hereinafter.

FIG. 14 is a diagram illustrating another example of an assignment pattern for secondary channels for each of PALs. Channel 6 for PAL_A, channel 1 for PAL_B, channel 6 for PAL_C, channel 4 for PAL_D, channel 1 for PAL_E, channel 4 for PAL_F, and channel 1 for PAL_G are assigned as the secondary channels.

Figure 15A:
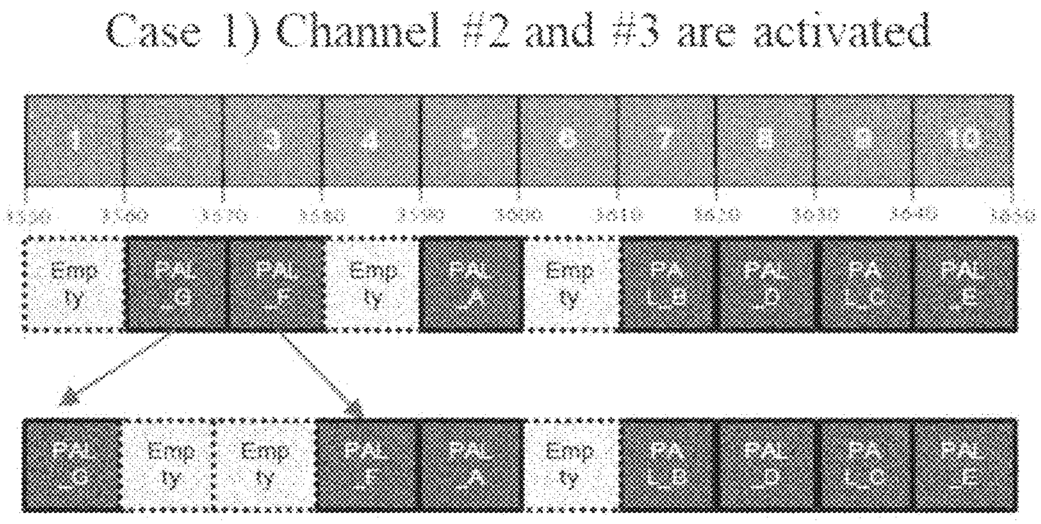
FIG. 15A is a diagram illustrating another example of transitioning from a primary channel to a secondary channel.
Figure 15B:
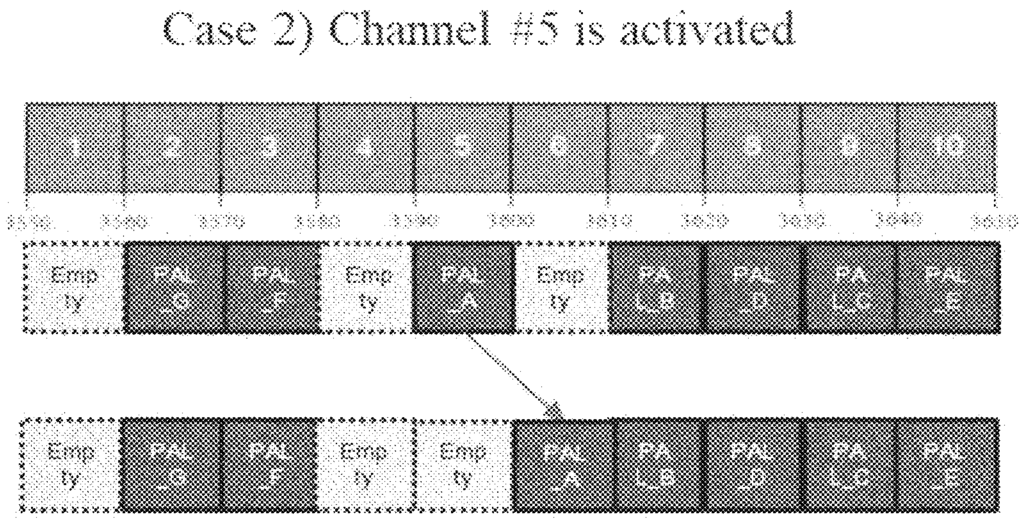
FIG. 15B is a diagram illustrating another example of transitioning from a primary channel to a secondary channel.
Figure 15C:
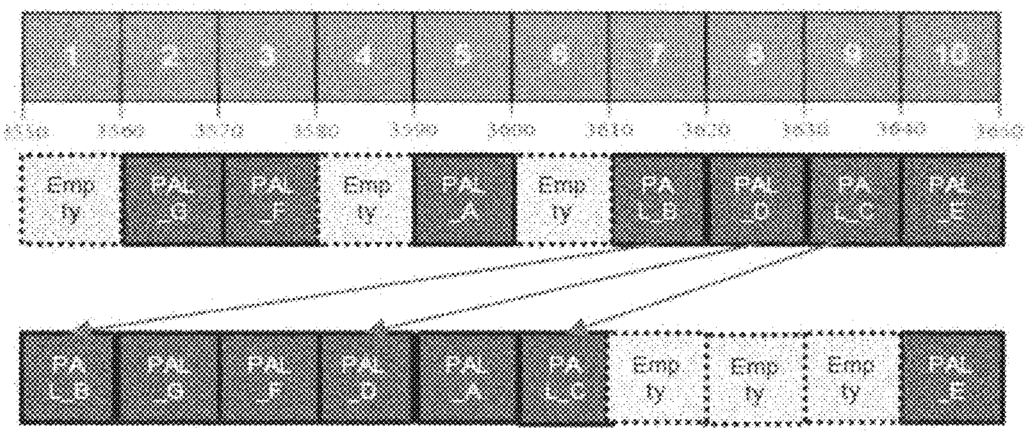
FIG. 15C is a diagram illustrating another example of transitioning from a primary channel to a secondary channel.
Figure 15D:
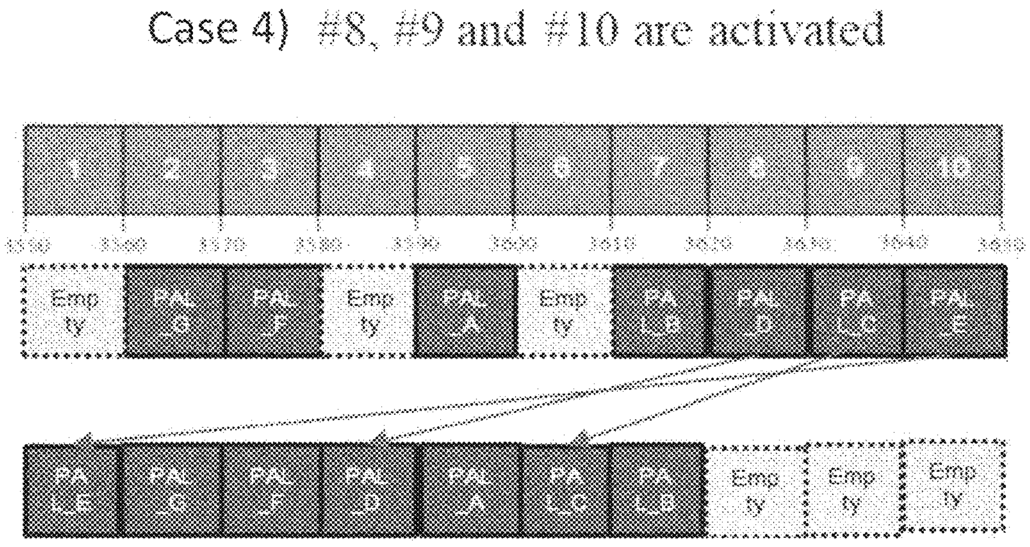
FIG. 15D is a diagram illustrating another example of transitioning from a primary channel to a secondary channel.

FIGS. 15A, 15B, 15C, and 15D illustrate other examples of applying the pattern of FIG. 11 to transition from the primary channels to the secondary channels. In the example in FIG. 15A, an incumbent activity change occurs on channels 2 and 3, which are primary channels, and the channels of PAL_G and PAL_F (the primary channels 2 and 6) are transitioned to channels 1 and 4, which are secondary channels. In this case, the primary channels on which the incumbent activity has changed can be transitioned to the secondary channels without conflict. In the case of FIG. 15B, a change in incumbent activity has occurred on only one primary channel, whereas in the case of FIGS. 15C and 15D, the change in incumbent activity has occurred on three consecutive primary channels. In any of the cases illustrated in FIGS. 15B, 15C, and 15D, the primary channels on which the incumbent activity has changed can be transitioned to the secondary channels without conflict.

Taking this from another perspective, if a change in incumbent activity occurs simultaneously on non-consecutive channels, the secondary channels may conflict between different PALs when transitioning to the secondary channels.

Accordingly, in the present embodiment, control is performed according to the above-described basic policy. That is, if at some point the incumbent activity changes on two or three primary channels simultaneously, and the secondary channels assigned to PAL holders using the primary channels based on the PALs are different among the PAL holders, the PAL rights are permitted to be exercised on those secondary channels (PAL grants are given). In other words, transitioning to the secondary channels is permitted. If the secondary channels are the same among at least some of the PAL holders, none of those PAL holders are permitted to exercise their PAL rights on the secondary channels. In other words, transitioning to the secondary channels is prohibited. The two or three primary channels described above are, to speak more generally, a number of primary channels that is at least two but not greater than the number of free channels.

It is considered rare for a plurality of primary channels on which incumbent activity changes to be non-consecutive and for the secondary channels of PAL holders using these PAL channels to overlap. It is also considered rare for the number of channels on which incumbent activity changes to spread across four or more channels. As such, applying this basic policy makes it possible to adequately provide service contiguity to the PAL holders.

The basic policy can be applied even if the changes in the incumbent activity (the start of radio wave transmission on the plurality of channels) do not occur simultaneously. An example of the application will be given hereinafter.

Figure 16:
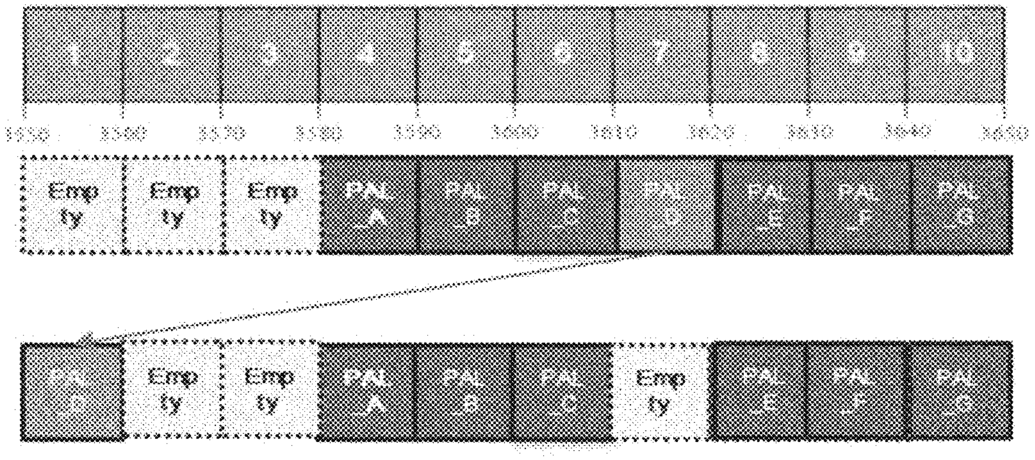
FIG. 16 is a diagram illustrating an example of the application of a basic policy.

FIG. 16 is a diagram illustrating an example of the application of the basic policy. Assuming the pattern in FIG. 11, at a given time to, it is assumed that only PAL_D has transitioned to the secondary channels. In this state, it is assumed that at time t1, a further change in incumbent activity occurs on a given channel. If the channel is channel 4 or channel 10, PAL_A and PAL_G are assigned the same secondary channel as PAL_D, and thus conflict arises. In this case, the processing unit 32 of the SAS 130 performs processing to maintain the transition state of PAL_D, and not transition PAL_A and PAL_G to the secondary channel. On the other hand, if the change in the incumbent activity is on any of channels 5, 6, 8, or 9, such conflict does not occur, and thus any one of PAL_B, PAL_C, PAL_E, or PAL_F can be transitioned to the secondary channels.

[Preparations for Processing for Transitioning to Secondary Channel (1): Generation of PPA for Secondary Channel]

In the current WInnForum specification, for the SAS 130 to give or issue a PAL grant in the primary channel to the CBSD 110, the SAS 130 obtains a list of CBSDs constituting the aforementioned PAL Protection Area (PPA) from the PAL holders, as a PPA cluster list for the primary channels (a "primary channel PPA cluster list" or "primary list"). More specifically, the SAS 130 obtains the primary channel PPA cluster list from, for example, the devices of the PAL holders or the CBSDs, and holds the obtained primary channel PPA cluster list in the storage unit 35. The primary channel PPA cluster list includes a set of CBSDs to configure the primary channel PPA. It is necessary for the SAS to calculate the PPA prior to the spectrum inquiry procedure and the spectrum grant procedure.

In the present embodiment, as described above, the SAS 130 obtains a PPA cluster list for the secondary channels (a "secondary channel PPA cluster list" or "secondary list") from the apparatuses of the PAL holders or the CBSDs, and generates a secondary PPA based on the secondary channel PPA cluster list.

Here, as described above, the secondary channel PPA cluster list and the primary channel PPA cluster list may be the same or different. Permitting two different types of PPA cluster lists makes it possible for PAL holders to design more flexible network cells in light of transitions of only some CBSDs to secondary channels.

The primary PPA cluster list and the secondary PPA cluster list may be provided to the SAS from the apparatuses of the PAL holders, or may be provided from the CBSD 110 to the SAS 130 as CBSD group information.

Figure 17:
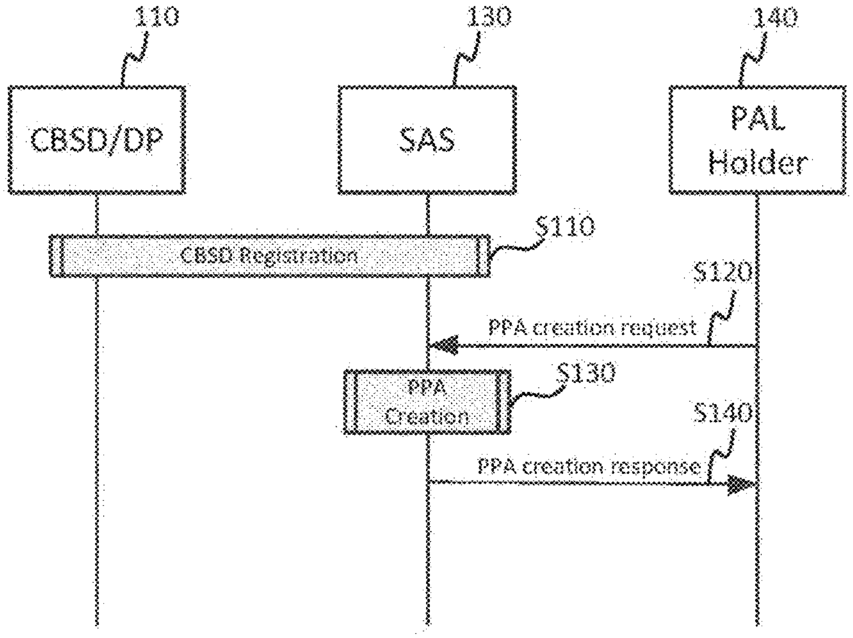
FIG. 17 is a sequence chart illustrating an example of PPA creation processing.

FIG. 17 is a sequence chart illustrating an example of the PPA creation processing performed by the SAS 130. First, CBSD registration processing is performed between the CBSD 110 (or the Domain Proxy (DP)) and the SAS 130 in advance to register the CBSD 110 with the SAS 130 (S110). Although only one CBSD 110 is illustrated in the figure, a plurality of CBSDs 110 perform the CBSD registration processing with the SAS 130, respectively. In the CBSD registration processing, both the SAS 130 and the CBSD 110 notify each other that at least the Grant Update feature (specified in WINNF-TS-3002-V1.3.0) and a PAL channel reassignment feature, which is a function according to the present embodiment, are operationally supported by the Feature Capability Exchange procedure, which is a procedure for exchanging capability information with each other. The function according to the present embodiment is referred to as the "PAL channel reassignment feature", but of course, another name may be used instead. "PAL channel reassignment" means at least one of transitioning from the primary channel to the secondary channel and returning from the second channel to the primary channel.

After the CBSD registration processing, an apparatus 140 of the PAL holder transmits a PPA creation request to the SAS 130 (S120). The PPA creation request includes the PAL information and the primary PPA cluster list including the registered CBSDs, and further includes the secondary PPA cluster list. At this time, if a CBSD that has not declared operational support for the PAL channel reassignment feature is included in any PPA cluster list, the SAS 130 may send instruction data instructing the apparatus 140 of the PAL holder to perform the registration procedure or the Feature Capability Exchange procedure again. The instruction data may be sent to a CBSD that has not declared support, rather than the apparatus 140 of the PAL holder.

The SAS 130 creates the primary PPA and the secondary PPA based on the primary PPA cluster list, the secondary PPA cluster list, and the CBSD registration information (PPA creation) (S130).

The SAS 130 transmits the information of the created primary PPA and the secondary PPA to the apparatus 140 of the PAL holder (S140).

Figure 18A:
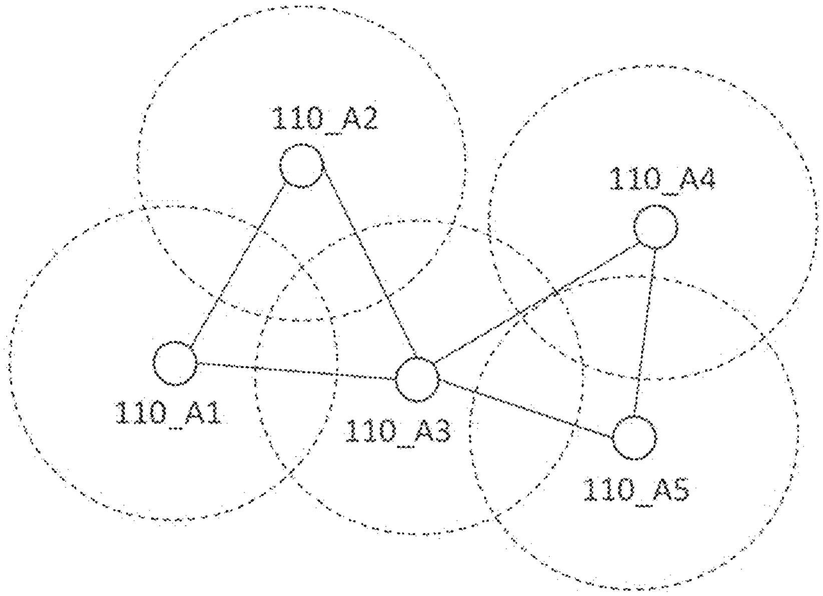
FIG. 18A is a diagram illustrating an example of creating a primary PPA for a given PAL holder.
Figure 18B:
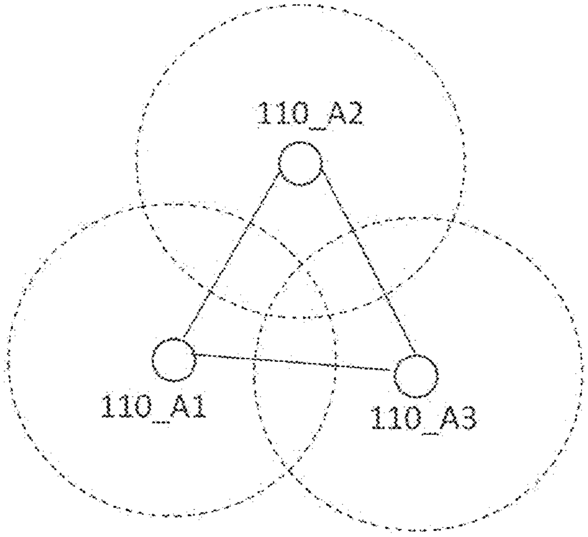
FIG. 18B is a diagram illustrating an example of creating a secondary PPA for a given PAL holder.

FIGS. 18A and 18B are diagrams illustrating an example of creating a primary PPA and a secondary PPA for a given PAL holder. FIG. 18A illustrates the arrangement of five CBSDs (CBSD 110_A1 to CBSD 110_A5) of a PAL holder A. CBSDs that are within a range in which radio waves reach each other are connected by wires. If these five CBSDs are registered in the primary PPA cluster list, the coverages of the CBSDs indicated by the circular dotted lines in FIG.

18A are integrated (combined), and the outline of the integrated coverages is calculated and determined as the primary PPA. It is assumed that three of these five CBSDs (CBSD 110_A1 to CBSD 110_A3) are registered in the secondary PPA cluster list. FIG. 18B illustrates the arrangement of these three CBSDs. The coverages of the CBSDs indicated by the circular dotted lines in FIG. 18B are integrated (combined), and the outline of the integrated coverages is calculated and determined as the secondary PPA. Note that if the secondary PPA cluster list is the same as the primary PPA cluster list, the secondary PPA is the same as the primary PPA. The PAL holder that obtains the information of the primary PPA may make settings for suppressing interference between the CBSDs in the primary PPA (for example, beamforming, transmission power, and the like) in each CBSD. Similarly, the PAL holder that obtains the information of the secondary PPA may make settings for suppressing interference between the CBSDs in the primary PPA (for example, beamforming, transmission power, and the like) in each CBSD.

[Preparations for Processing for Transitioning to Secondary Channel (2): Issuing PAL Grant Corresponding to Primary Channel and GAA Grant Corresponding to Secondary Channel to CBSD of PAL Holder]

Considering the current nature of CBRS operation (CPAS performed once every 24 hours, grant state management, and the like), it is undesirable, from the perspective of the continuity of communication services, to discard the PAL grant for the primary channel and obtain a new PAL grant for the secondary channel, for reasons such as the time taken until the channel change is applied, the complexity of the processing, and the like. Accordingly, in the present embodiment, in preparation for the processing for transitioning to the secondary channel, the SAS 130 provides (issues) a PAL grant corresponding to the primary channel and a GAA grant corresponding to the secondary channel to the CBSD of the PAL holder. The SAS 130 uses the aforementioned primary PPA cluster list and the secondary PPA cluster list to provide each grant.

Figure 19:
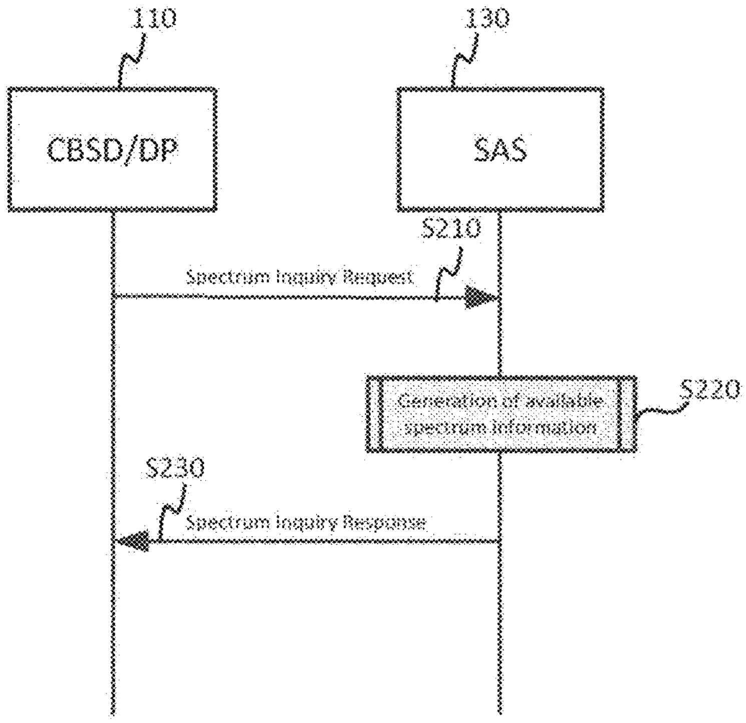
FIG. 19 is a sequence chart illustrating an example of a spectrum inquiry procedure.

FIG. 19 is a sequence chart illustrating an example of a spectrum inquiry procedure performed between the CBSD 110 and the SAS 130 that operationally support the function according to the present embodiment (the PAL channel reassignment feature).

The CBSD 110 transmits a spectrum inquiry request to the SAS 130 to inquire as to the available spectrum (channels) (S210). The SAS 130 communicates a spectrum inquiry response including at least the information mentioned below as available spectrum information to the CBSD 110 (S220, S230). However, it is assumed here that the incumbent activity has not changed (radio wave transmission has not started). The SAS 130 transmits information on the secondary channels that can be assigned only when the CBSD 110 is included in the secondary PPA cluster list (the secondary list).

- Information on the primary channels for which a PAL grant can be given
- Information on the secondary channels that can be assigned Currently, WINNF-TS-0016 (Release 1) and WINNF-TS-3002 (Release 2) define an AvailableChannel object as an object representing the available spectrum information included in a spectrum inquiry response.

FIG. 20 is a diagram illustrating the configuration of the AvailableChannel object defined in WINNF-TS-0016 (Release 1) and WINNF-TS-3002 (Release 2).

Setting the parameters of the AvailableChannel object as in Example 1 below makes it possible to communicate the information of the primary channels for which a PAL grant can be provided.

Example 1 frequencyRange: the upper and lower limits of the frequency range indicating the primary channel
channelType: a character string set to "PAL"
ruleApplied: a character string set to "FCC_PART_96"
maxEirp: the maximum EIRP By applying a similar method, it is conceivable to communicate the information of the secondary channels by setting the parameters of the AvailableChannel object as in Example 2 below for the secondary channel information.

Example 2 frequencyRange: the upper and lower limits of the frequency range indicating the secondary channel
channelType: a character string set to "GAA"
ruleApplied: a character string set to "FCC_PART_96"
maxEirp: the maximum EIRP However, having received the spectrum inquiry response, the CBSD cannot determine whether the information in Example 2 indicates the secondary channel of the PAL. This is because the same settings as those in Example 2 can be set even if the information is for the CBSD of an operator in which the CBSD does not hold a PAL.

It is therefore preferable for information indicating whether the information in the AvailableChannel object indicates the secondary channel of the PAL to be added as a parameter of the AvailableChannel object.

For example, a string-type parameter called palChannelType is added to the AvailableChannel object. For a primary channel, a character string "PRIMARY" can be set, and for a secondary channel, a character string "SECONDARY" can be set. The names and types are given as examples to facilitate the descriptions, and other examples are possible.

Naturally, this added new parameter is preferably used for the CBSDs included in both the primary PPA cluster list and the secondary PPA cluster list (the CBSDs included in both cluster lists can benefit from the effects of the present embodiment). Specifically, the parameters are set as indicated below. However, it is assumed here that the incumbent activity on the primary channel has not changed (radio wave transmission has not started).

[Parameter Setting Example P1 for Communicating Information on Primary Channels for which PAL Grant can Be Given]

frequencyRange: the upper and lower limits of the frequency range indicating the primary channel
channelType: a character string set to "PAL"
ruleApplied: a character string set to "FCC_PART_96"
maxEirp: the maximum EIRP
palChannelType: a character string set to "PRIMARY"

[Parameter Setting Example S1 for Communicating Information on Assignable Secondary Channels (for which GAA Grant can Be Given)]

frequencyRange: the upper and lower limits of the frequency range indicating the secondary channel
channelType: a character string set to "GAA"
ruleApplied: a character string set to "FCC_PART_96"
maxEirp: the maximum EIRP
palChannelType: a character string set to "SECONDARY"

This system can also be used when the incumbent activity changes (radio wave transmission begins) and the channel is transitioned. In this case, the parameters may be set as indicated below.

[Parameter Setting Example P22 for Communicating Information on Primary Channels for which GAA Grant can Be Given]

frequencyRange: the upper and lower limits of the frequency range indicating the primary channel
channelType: a character string set to "GAA"
ruleApplied: a character string set to "FCC_PART_96"
maxEirp: the maximum EIRP palChannelType: a character string set to "PRIMARY"

[Parameter Setting Example S2 for Communicating Information on Secondary Channels for which PAL Grant can Be Given]

frequencyRange: the upper and lower limits of the frequency range indicating the secondary channel
channelType: a character string set to "PAL".ruleApplied: a character string set to "FCC_PART_96"
maxEirp: the maximum EIRP palChannelType: a character string set to "SECONDARY"

The values of "channelType" in the parameter setting examples P2 and S2 are reversed in the case of the parameter setting examples P1 and S1 described above.

By providing the available spectrum information to the CBSD 110 and the SAS 130 as a spectrum inquiry response, the CBSD 110 can request a PAL grant and a GAA grant in the subsequent spectrum grant procedure based on the provided available spectrum information. In other words, when the information in the parameter setting examples P1 and S2 is received, the CBSD 110 transmits a request to issue a PAL grant for the primary channel and a GAA grant for the secondary channel (a first request). Note that the CBSD 110 may or may not be permitted to use the channels by the SAS before the secondary channel for which the GAA grant was issued is transitioned to from the primary channel. When the information in the parameter setting examples P2 and S2 is received, the CBSD 110 transmits a request to issue a GAA grant for the primary channel and a PAL grant for the secondary channel (a second request). When issuing the PAL grant and the GAA grant in response to the first request or the second request, the SAS 130 may communicate the information of the palChannelType for the grant to be given to the CBSD 110 as a part of the response.

[Processing for Transitioning to Secondary Channel: When Determined that Transitioning to Secondary Channel Is Necessary, Channel Type (channelType) of PAL Grant Corresponding to Primary Channel Changed to GAA, and Channel Type of GAA Grant Corresponding to Secondary Channel Changed to PAL]

Figure 21:
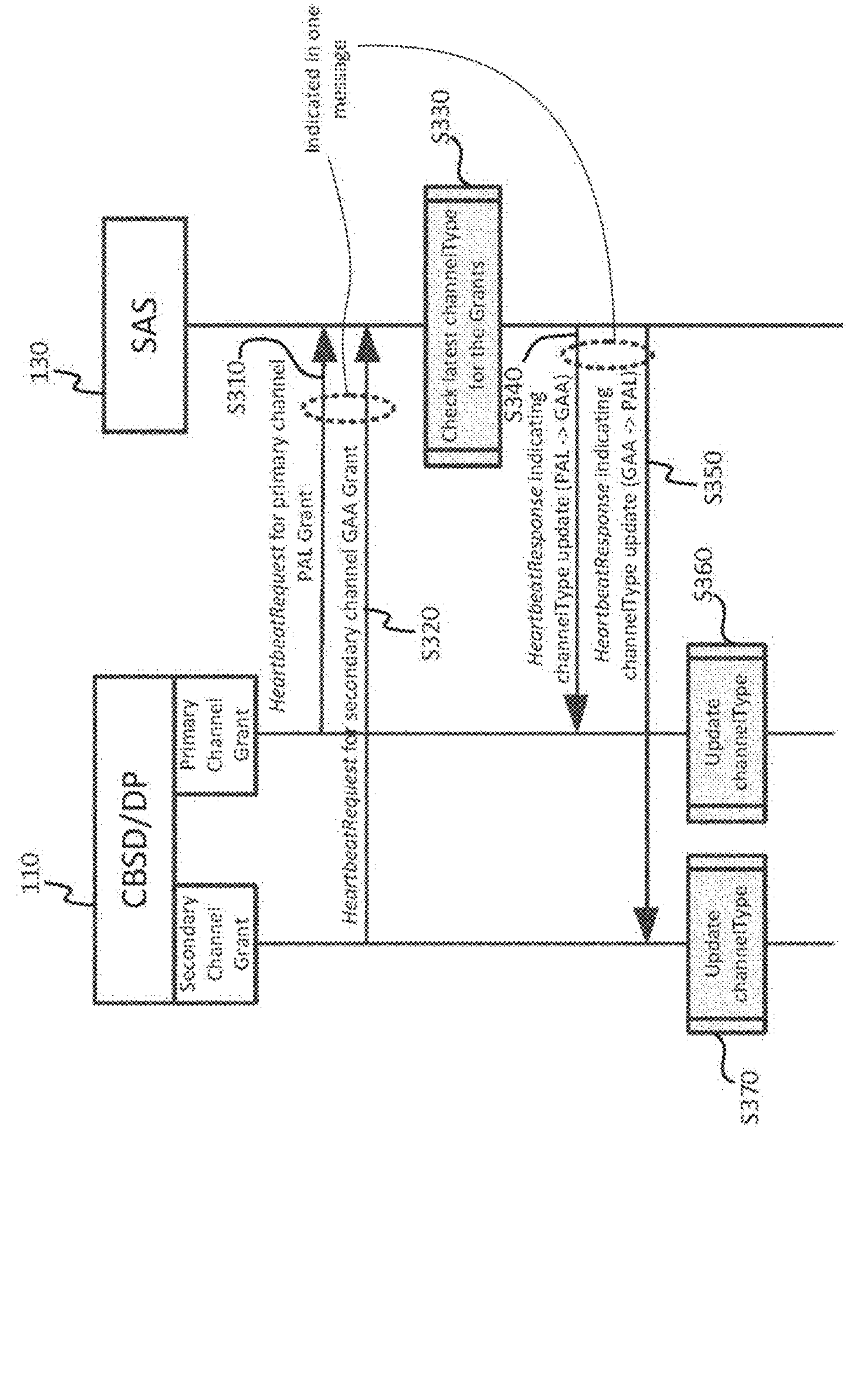
FIG. 21 is a sequence chart illustrating an example of a procedure performed when transitioning to a secondary channel in a situation where a CBSO is using the primary channel.

FIG. 21 is a sequence chart illustrating an example of a procedure performed when transitioning to a secondary channel in a situation where the CBSD 110 is using the primary channel.

The CBSD 110 transmits a heartbeat request for the PAL grant for the primary channel and the heartbeat request for the GAA grant for the secondary channel as a heartbeat procedure (S310, S320). These heartbeat requests may be transmitted together in a single message.

The SAS 130 receives these heartbeat requests and determines whether the CBSD 110 may continue to use the primary channel, i.e., whether a transition to the secondary channel is necessary (S330). When the SAS 130 determines that it is necessary for the CBSD 110 to transition to the secondary channel, the channel type of the PAL grant of the CBSD 110 is changed to "GAA", and the channel type of the GAA grant corresponding to the secondary channel is changed to "PAL". This change is performed based on the Grant Update feature described above.

Specifically, in a heartbeat response to the heartbeat request for the primary channel PAL grant, the SAS 130 sets the latest channel type (channelType) of the grant corresponding to a HeartbeatResponse object to GAA (S340). Additionally, in a heartbeat response to the heartbeat request for the secondary channel PAL grant, the SAS 130 sets the latest channel type (channelType) of the grant corresponding to a HeartbeatResponse object to PAL (S350). These heartbeat responses may be transmitted together in a single message.

Additionally, it is desirable for the SAS 130 to set the grant state to "Granted" (responseCode 501 SUSPENDED_GRANT) for the post-transition GAA grant in the primary channel. "Granted" means that radio wave transmission is not permitted. Additionally, it is desirable for the SAS 130 to not change the GAA grant of the secondary channel to the PAL grant until the change of the grant of the primary channel from the PAL grant to the GAA grant is complete.

Based on the heartbeat response received from the SAS 130, the CBSD 110 transitions from the primary channel to the secondary channel by changing the grant of the primary channel from the PAL grant to the GAA grant (S360) and the grant of the secondary channel from the GAA grant to the PAL grant (S370).

[Processing for Returning to Primary Channel: When Determined to Return from Secondary Channel to Primary Channel, Channel Type of Grant Corresponding to Primary Channel Changed to PAL, and Channel Type of Grant Corresponding to Secondary Channel Changed to GAA]

Figure 22:
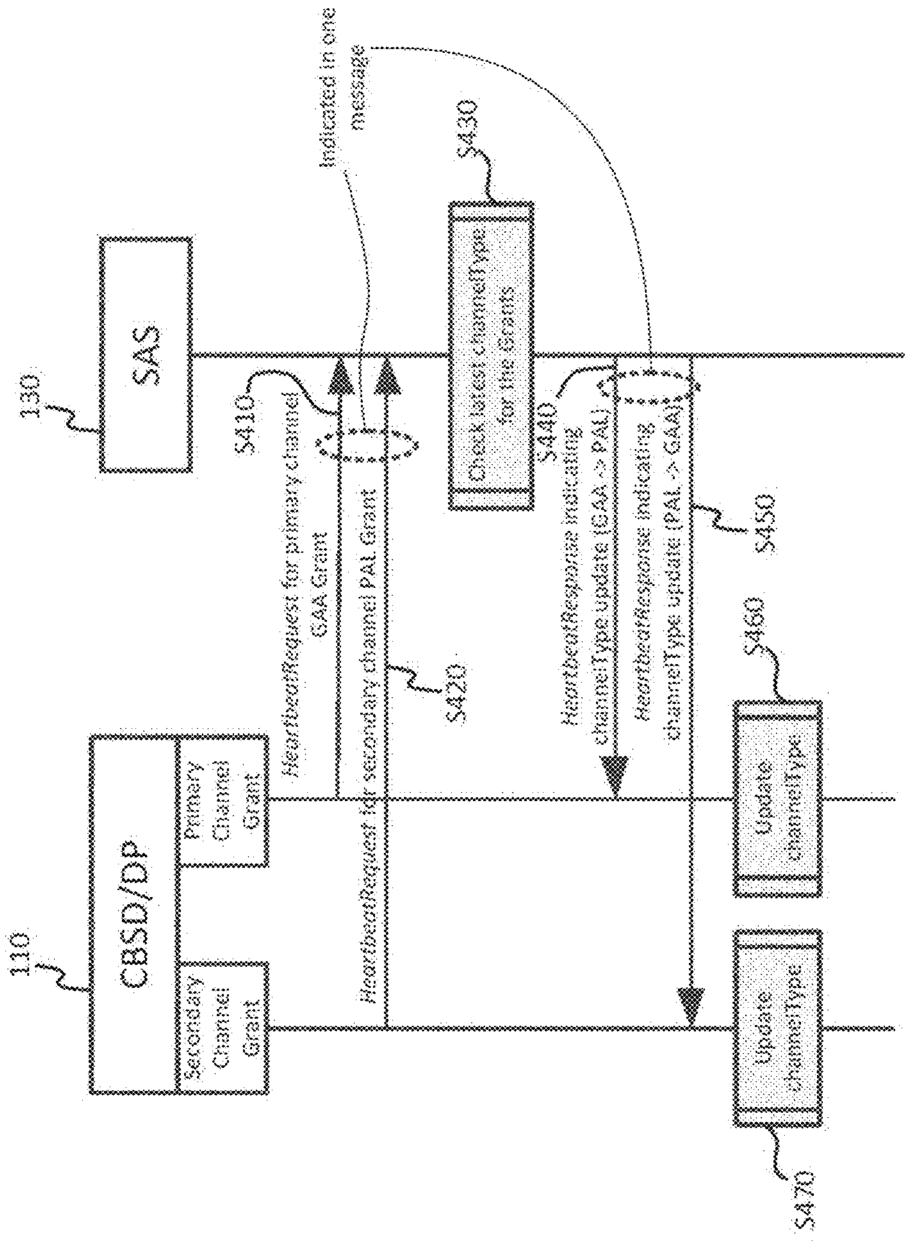
FIG. 22 is a sequence chart illustrating an example of a procedure performed when returning to a primary channel.

FIG. 22 is a sequence chart illustrating an example of the procedure performed when returning to the primary channel.

The CBSD 110 transmits a heartbeat request for the GAA grant for the primary channel and the heartbeat request for the PAL grant for the secondary channel as a heartbeat procedure (S410, S420). These heartbeat requests may be transmitted together in a single message.

The SAS 130 receives these heartbeat requests and determines whether the CBSD 110 may continue to use the secondary channel as the channel for the PAL grant, i.e., whether it is possible or necessary to transition (return) to the primary channel (S430). When the SAS 130 determines that it is possible or necessary to return to the primary channel, the channel type of the grant for the primary channel of the CBSD 110 is changed to "PAL", and the channel type of the grant corresponding to the secondary channel is changed to "GAA". This change is performed based on the Grant Update feature described above.

Specifically, in a heartbeat response to the heartbeat request for the primary channel GAA grant, the SAS 130 sets the latest channel type (channelType) of the grant corresponding to a HeartbeatResponse object to PAL (S440).

Additionally, in a heartbeat response to the heartbeat request for the secondary channel PAL grant, the SAS 130 sets the latest channel type (channelType) of the grant corresponding to a HeartbeatResponse object to "GAA" (S450). These heartbeat responses may be transmitted together in a single message.

Additionally, the SAS 130 may set the grant state to "Authorized" for the PAL grant in the primary channel after the return. "Authorized" means that radio wave transmission is permitted. Additionally, it is desirable for the SAS 130 to not change the channel type of the grant of the primary channel from "GAA" to "PAL" (i.e., not change the primary channel from the GAA grant to the PAL grant) until the change of the grant of the secondary channel from the PAL grant to the GAA grant is complete.

Based on the heartbeat response received from the SAS 130, the CBSD 110 transitions from the secondary channel to the primary channel by changing the grant of the primary channel from the GAA grant to the PAL grant (S460) and the grant of the secondary channel from the PAL grant to the GAA grant (S470).

[Secondary PPA Protection Processing: Performing Protection Calculation for Secondary PPA in Addition to Primary PPA in CPAS]

In the case of a conventional SAS, PPA protection cannot be applied immediately on the secondary channel after transitioning to the secondary channel. This is because only the protection calculation for the primary PPA is performed in Coordinated Periodic Activity among SASs (CPAS).

In the present embodiment, the SAS 130 performs the protection calculation for the secondary PPA in addition to the primary PPA during CPAS. However, in the corresponding secondary channel, the SAS 130 performs all the protection calculations, including incumbent protection, for both the case where a secondary PPA is present, and the case where a secondary PPA is not present. The protection calculation for the primary PPA is performed in both the case where a secondary PPA is present, and the case where a secondary PPA is not present. However, as a variation, there may be cases where it is acceptable to exclude the application of the primary PPA when applying the secondary PPA. Note that incumbent protection is, for example, determining the transmission power of the CBSD to be managed by the SAS 130 such that the cumulative interference power at a target point for incumbent protection is not greater than a threshold.

After the CPAS, the SAS 130 is assumed to apply the result of the protection calculation for when there is no secondary PA (i.e., there is no change in incumbent activity), and applies the result of the protection calculation for when there is a secondary PPA after transitioning to the secondary channel. The application of the result of the protection calculation for the secondary PPA can cause, for example, a change in the transmission power of the grant for other CBSDs that do not belong to the secondary PPA (e.g., the CBSD that originally used the secondary channel with the GAA) (that is, the transmission power of the other CBSDs may be changed to a low value, for example). The transmission power for the other CBSDs may be changed using the "Grant Update feature" as well. This makes it possible to set the state of the PAL grant in the secondary channel to "Authorized" and enable the CBSD to emit radio waves in a state where the interference protection of the secondary PPA is applied, immediately after transitioning to the secondary channel.

According to the present embodiment, the transition from the primary channel to the secondary channel can be performed quickly and easily, which makes it possible to increase the utilization efficiency of the secondary channel and in turn increase the frequency utilization efficiency.

It should be noted that the above-described embodiments show examples for embodying the present disclosure, and the present disclosure can be implemented in various other forms. For example, various modifications, substitutions, omissions, or combinations thereof are possible without departing from the spirit and scope of the present disclosure. Forms representing such modifications, replacements, omissions, and the like also fall within the scope of the present disclosure as well as the scopes of the invention as set forth in the scope of claims and equivalents thereof.

In addition, the effects of the present disclosure described herein are merely exemplary and may have other effects.

The present disclosure may have the following configuration.

[Item 1]

A communication control apparatus including:

a communication unit that, based on a right to use radio waves with priority, communicates with at least one of first to N-th communication apparatuses that use first to N-th channels among a plurality of channels as primary channels and to which channels different from the first to N-th channels are assigned as secondary channels;

a detection unit that detects that radio waves have been used by a protected system in at least one target channel among the first to N-th channels; and a processing unit that, based on a usage condition of the secondary channel assigned to a target communication apparatus that, among the first to N-th communication apparatuses, is using the target channel as the primary channel, transitions a channel used by the target communication apparatus from the primary channel to the secondary channel when radio waves are detected to have been used in the target channel.

[Item 2]

The communication control apparatus according to Item 1, wherein based on the usage condition of the secondary channel, the processing unit determines whether the channel used by the target communication apparatus can be transitioned to the secondary channel, and when the channel used by the target communication apparatus can be transitioned to the secondary channel, performs the processing for transitioning the channel used by the target communication apparatus to the secondary channel.

[Item 3]

The communication control apparatus according to Item 2, wherein the usage condition is that, when a plurality of the target channels are present, the secondary channels assigned to a plurality of the target communication apparatuses using the target channels are different from each other.

[Item 4]

The communication control apparatus according to Item 3, wherein the processing unit determines that none of the plurality of the target communication apparatuses can be transitioned to the secondary channel when at least two of the secondary channels assigned to the plurality of the target communication apparatuses are identical.

[Item 5]

The communication control apparatus according to Item 3 or 4, wherein a total number of secondary channels assigned to the first to N-th communication apparatuses is X, and the secondary channels assigned to the communication apparatuses using any of the X channels, among the first to N-th channels, that are adjacent along a frequency axis, are different from each other.

[Item 6]

The communication control apparatus according to any one of Items 1 to 5, wherein the processing unit obtains first to N-th primary lists that are lists of a plurality of the first communication apparatuses to a plurality of the N-th communication apparatuses, and first to N-th secondary lists that are lists of the first to N-th communication apparatuses that, among the plurality of the first communication apparatuses to the plurality of the N-th communication apparatuses, are subject to transitioning to the secondary channel, the processing unit calculates first to N-th primary protected areas based on a power value at which radio waves can be transmitted by the first communication apparatuses to the N-th communication apparatuses included in the first to N-th primary lists, and the processing unit calculates first to N-th secondary protected areas based on a power value at which radio waves can be transmitted by the first communication apparatuses to the N-th communication apparatuses included in the first to N-th secondary lists.

[Item 7]

The communication control apparatus according to Item 6, wherein the processing unit performs a protection calculation for the primary protected areas and a protection calculation for the secondary protected areas, the communication control apparatus further includes a storage unit that stores at least a result of the protection calculation for the secondary protected area, and interference protection for the communication device from outside the primary protected area is performed based on a result of the protection calculation for the primary protected area, and when the channel used by the communication device is transitioned to the secondary channel, interference protection for the communication device from outside the secondary protected area is performed based on a result of the protection calculation for the secondary protected area stored in the storage unit.

[Item 8] Point 3

The communication control apparatus according to any one of Items 1 to 7, wherein the processing unit transmits, to the first communication apparatuses to the N-th communication apparatuses, first to N-th primary channel information including candidates for channels that the first to N-th communication apparatuses can use as the primary channels, and transmits, to the first to N-th communication apparatuses, first to N-th secondary channel information including candidates for channels that can be assigned to the first to N-th communication apparatuses as the secondary channels.

[Item 9]

The communication control apparatus according to Item 8, wherein the processing unit receives, from the first communication apparatuses to the N-th communication apparatuses, a first request that requests permission to use a channel as the primary channel, and, based on the first request received, determines channels to be granted to the first to N-th communication apparatuses from among the candidates for the channels in the first to N-th primary channel information, and the processing unit receives, from the first communication apparatuses to the N-th communication apparatuses, a second request that requests a channel to be assigned as the secondary channel, and, based on the second request received, determines channels to be assigned to the first to N-th communication apparatuses from among the candidates for the channels in the first to N-th secondary channel information.

[Item 10]

The communication control apparatus according to Item 9, wherein the processing unit transmits a first response including information of a channel permitted to be used as the primary channel to the first to N-th communication apparatuses, and the processing unit transmits a second response including information of a channel permitted to be used as the secondary channel to the first to N-th communication apparatuses.

[Item 11]

The communication control apparatus according to Item 9 or 10, further including:

first to N-th secondary lists of first communication apparatuses to N-th communication apparatuses that, among the plurality of the first communication apparatuses to the plurality of the N-th communication apparatuses, are subject to transitioning to the secondary channel, wherein the processing unit transmits the first to N-th secondary channel information only to the first communication apparatuses to the N-th communication apparatuses included in the first to N-th secondary lists.

[Item 12]

The communication control apparatus according to any one of Items 1 to 11, wherein the processing unit sets channel types of the first to N-th channels used by the first communication apparatuses to the N-th communication apparatuses as the primary channels to a first type that uses radio waves at a first priority, and sets the channel types of the channels assigned as the secondary channels to a second type that uses radio waves at a second priority lower than the first priority, and in processing for transitioning the channel used by the target communication apparatus from the primary channel to the secondary channel, the processing unit sets the channel type of the primary channel to be transitioned from to the second type, and sets the channel type of the secondary channel to be transitioned to to the first type.

[Item 13] The communication control device according to Item 12, wherein the detection unit detects that usage of the radio waves by the protected system has ended, and the processing unit performs processing for returning the channel used by the target communication apparatus from the secondary channel to the primary channel, sets the channel type of the secondary channel to be returned from to the second type, and sets the channel type of the primary channel to be returned to to the first type.

[Item 14] Point 1

A communication control method including:

communicating, based on a right to use radio waves with priority, with at least one of first to N-th communication apparatuses that use first to N-th channels among a plurality of channels as primary channels and to which channels different from the first to N-th channels are assigned as secondary channels; detecting that radio waves have been used by a protected system in at least one target channel among the first to N-th channels; and performing processing for, based on a usage condition of the secondary channel assigned to a target communication apparatus that, among the first to N-th communication apparatuses, is using the target channel as the primary channel, transitioning a channel used by the target communication apparatus from the primary channel to the secondary channel.

[Item 15] Point 1

A computer program for causing a computer to execute:

a step of communicating, based on a right to use radio waves with priority, with at least one of first to N-th communication apparatuses that use first to N-th channels among a plurality of channels as primary channels and to which channels different from the first to N-th channels are assigned as secondary channels;

a step of detecting, when radio waves are detected to have been used by a protected system in at least one target channel among the first to N-th channels, a target communication apparatus that, among the first to N-th communication apparatuses, is using the target channel as the primary channel; and a step of performing processing for, based on a usage condition of the secondary channel assigned to the target communication apparatus, transitioning a channel used by the target communication apparatus from the primary channel to the secondary channel.

REFERENCE SIGNS LIST

11 Receiving unit
12 Processing unit
13 Control unit
14 Transmitting unit
15 Storage unit
31 Receiving unit
32 Processing unit
33 Control unit
34 Transmitting unit
35 Storage unit
36 Detection unit
110, 110A, 110B, 110C, A to D, 110_1 to 110_3 Communication apparatus (CBSD)
120 Terminal
130, 130A, 130B Communication control apparatus (SAS)

The invention claimed is:

1. A communication control apparatus comprising:

a communication unit that, based on a right to use radio waves with priority, communicates with at least one of first to N-th communication apparatuses that use first to N-th channels among a plurality of channels as primary channels and to which channels different from the first to N-th channels are assigned as secondary channels;

a detection unit that detects that radio waves have been used by a protected system in at least one target channel among the first to N-th channels; and a processing unit that, based on a usage condition of the secondary channel assigned to a target communication apparatus that, among the first to N-th communication apparatuses, is using the target channel as the primary channel, transitions a channel used by the target communication apparatus from the primary channel to the secondary channel when radio waves are detected to have been used in the target channel.

2. The communication control apparatus according to claim 1, wherein based on the usage condition of the secondary channel, the processing unit determines whether the channel used by the target communication apparatus can be transitioned to the secondary channel, and when the channel used by the target communication apparatus can be transitioned to the secondary channel, performs processing for the transition of the channel used by the target communication apparatus to the secondary channel.

3. The communication control apparatus according to claim 2, wherein the usage condition is that, when a plurality of the target channels are present, the secondary channels assigned to a plurality of target communication apparatuses using the target channels are different from each other.

4. The communication control apparatus according to claim 3, wherein the processing unit determines that none of the plurality of target communication apparatuses can be transitioned to the secondary channel when at least two of the secondary channels assigned to the plurality of target communication apparatuses are identical.

5. The communication control apparatus according to claim 3, wherein a total number of secondary channels assigned to the first to N-th communication apparatuses is X, and the secondary channels assigned to the communication apparatuses using any of the X channels, among the first to N-th channels, that are adjacent along a frequency axis, are different from each other.

6. The communication control apparatus according to claim 1, wherein the processing unit obtains first to N-th primary lists that are lists of a plurality of first communication apparatuses to a plurality of N-th communication apparatuses, and first to N-th secondary lists that are lists of the first to N-th communication apparatuses that, among the plurality of first communication apparatuses to the plurality of N-th communication apparatuses, are subject to transitioning to the secondary channel, the processing unit calculates first to N-th primary protected areas based on a power value at which radio waves can be transmitted by the first communication apparatuses to the N-th communication apparatuses included in the first to N-th primary lists, and the processing unit calculates first to N-th secondary protected areas based on a power value at which radio waves can be transmitted by the first communication apparatuses to the N-th communication apparatuses included in the first to N-th secondary lists.

7. The communication control apparatus according to claim 6, wherein the processing unit performs a protection calculation for the first to N-th primary protected areas and a protection calculation for the first to N-th secondary protected areas, the communication control apparatus further comprises a storage unit that stores at least a result of the protection calculation for a secondary protected area, and interference protection for a communication device from outside a primary protected area is performed based on a result of the protection calculation for the primary protected area, and when the channel used by the communication device is transitioned to the secondary channel, interference protection for the communication device from outside the secondary protected area is performed based on a result of the protection calculation for the secondary protected area stored in the storage unit.

8. The communication control apparatus according to claim 1, wherein the processing unit transmits, to the first to N-th communication apparatuses, first to N-th primary channel information including candidates for channels that the first to N-th communication apparatuses can use as the primary channels, and transmits, to the first to N-th communication apparatuses, first to N-th secondary channel information including candidates for channels that can be assigned to the first to N-th communication apparatuses as the secondary channels.

9. The communication control apparatus according to claim 8, wherein the processing unit receives, from the first to N-th communication apparatuses, a first request that requests permission to use a channel as the primary channel, and, based on the first request received, determines channels to be granted to the first to N-th communication apparatuses from among the candidates for the channels in the first to N-th primary channel information, and the processing unit receives, from the first to N-th communication apparatuses, a second request that requests a channel to be assigned as the secondary channel, and, based on the second request received, determines channels to be assigned to the first to N-th communication apparatuses from among the candidates for the channels in the first to N-th secondary channel information.

10. The communication control apparatus according to claim 9, wherein the processing unit transmits a first response including information of a channel permitted to be used as the primary channel to the first to N-th communication apparatuses, and the processing unit transmits a second response including information of a channel permitted to be used as the secondary channel to the first to N-th communication apparatuses.

11. The communication control apparatus according to claim 9, further comprising: first to N-th secondary lists of first communication apparatuses to N-th communication apparatuses that, among a plurality of first communication apparatuses to a plurality of N-th communication apparatuses, are subject to transitioning to the secondary channel, wherein the processing unit transmits the first to N-th secondary channel information only to the first communication apparatuses to the N-th communication apparatuses included in the first to N-th secondary lists.

12. The communication control apparatus according to claim 1, wherein the processing unit sets channel types of the first to N-th channels used by the first to N-th communication apparatuses as the primary channels to a first type that uses radio waves at a first priority, and sets the channel types of the channels assigned as the secondary channels to a second type that uses radio waves at a second priority lower than the first priority, and in processing for the transition of the channel used by the target communication apparatus from the primary channel to the secondary channel, the processing unit sets the channel type of the primary channel to be transitioned from to the second type, and sets the channel type of the secondary channel to be transitioned to to the first type.

13. The communication control apparatus according to claim 12, wherein the detection unit detects that usage of the radio waves by the protected system has ended, and the processing unit performs processing for returning the channel used by the target communication apparatus from the secondary channel to the primary channel, sets the channel type of the secondary channel to be returned from to the second type, and sets the channel type of the primary channel to be returned to to the first type.

14. A communication control method comprising:

communicating, based on a right to use radio waves with priority, with at least one of first to N-th communication apparatuses that use first to N-th channels among a plurality of channels as primary channels and to which channels different from the first to N-th channels are assigned as secondary channels;

detecting that radio waves have been used by a protected system in at least one target channel among the first to N-th channels; and performing processing for, based on a usage condition of the secondary channel assigned to a target communication apparatus that, among the first to N-th communication apparatuses, is using the target channel as the primary channel, transitioning a channel used by the target communication apparatus from the primary channel to the secondary channel.

15. A non-transitory storage medium storing a computer program for causing a computer to execute: a step of communicating, based on a right to use radio waves with priority, with at least one of first to N-th communication apparatuses that use first to N-th channels among a plurality of channels as primary channels and to which channels different from the first to N-th channels are assigned as secondary channels; a step of detecting, when radio waves are detected to have been used by a protected system in at least one target channel among the first to N-th channels, a target communication apparatus that, among the first to N-th communication apparatuses, is using the target channel as the primary channel; and a step of performing processing for, based on a usage condition of the secondary channel assigned to the target communication apparatus, transitioning a channel used by the target communication apparatus from the primary channel to the secondary channel.

* * * * *